United States Patent
Kawamata et al.

(10) Patent No.: US 9,514,648 B2
(45) Date of Patent: Dec. 6, 2016

(54) ALERTING APPARATUS

(71) Applicant: TOYOTA JIDOSHA KABUSHIKI KAISHA, Toyota-shi, Aichi-ken (JP)

(72) Inventors: Shinya Kawamata, Susono (JP); Kiyoto Hanita, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/939,524

(22) Filed: Nov. 12, 2015

(65) Prior Publication Data
US 2016/0140847 A1 May 19, 2016

(30) Foreign Application Priority Data

Nov. 14, 2014 (JP) .................................. 2014-231682

(51) Int. Cl.
G06F 7/00 (2006.01)
G08G 1/16 (2006.01)
B60W 30/095 (2012.01)

(52) U.S. Cl.
CPC .............. G08G 1/163 (2013.01); G08G 1/166 (2013.01); B60W 30/0953 (2013.01)

(58) Field of Classification Search
CPC .......... G08G 1/16; G08G 1/163; G08G 1/166
USPC .......... 701/45, 301, 404.1, 141, 36; 726/23; 382/104
See application file for complete search history.

(56) References Cited

U.S. PATENT DOCUMENTS

| | | | |
|---|---|---|---|
| 2003/0093187 A1* | 5/2003 | Walker | B64C 13/20 701/1 |
| 2004/0193347 A1 | 9/2004 | Harumoto et al. | |
| 2006/0206246 A1* | 9/2006 | Walker | G06Q 10/00 701/16 |
| 2008/0243389 A1 | 10/2008 | Inoue et al. | |
| 2010/0256852 A1* | 10/2010 | Mudalige | G08G 1/22 701/24 |
| 2015/0035685 A1* | 2/2015 | Strickland | B60Q 9/008 340/901 |
| 2015/0271201 A1* | 9/2015 | Ruvio | H04L 63/1408 726/23 |

FOREIGN PATENT DOCUMENTS

| | | |
|---|---|---|
| DE | 10 2010 044 631 A1 | 3/2012 |
| JP | 2008-242544 A | 10/2008 |
| JP | 2011-210102 A | 10/2011 |
| JP | 2013-134567 A | 7/2013 |

* cited by examiner

Primary Examiner — McDieunel Marc
(74) Attorney, Agent, or Firm — Sughrue Mion, PLLC

(57) ABSTRACT

An alerting apparatus issues an alert regarding a moving obstacle to a driver of a host vehicle when the host vehicle enters an intersection of a crossroad that is connected to a traveling road on which the host vehicle is traveling, and the traveling road, in a left-hand traffic jurisdiction. This alerting apparatus includes an ECU. The ECU is configured to issue the alert regarding the moving obstacle when it is determined that a path of the moving obstacle intersects with an intersect determination range, and set the intersect determination range to be shorter in length in a front-rear direction of the host vehicle when the traveling direction of the host vehicle is a left turn than when the traveling direction of the host vehicle is a right turn.

6 Claims, 21 Drawing Sheets

F I G. 14C
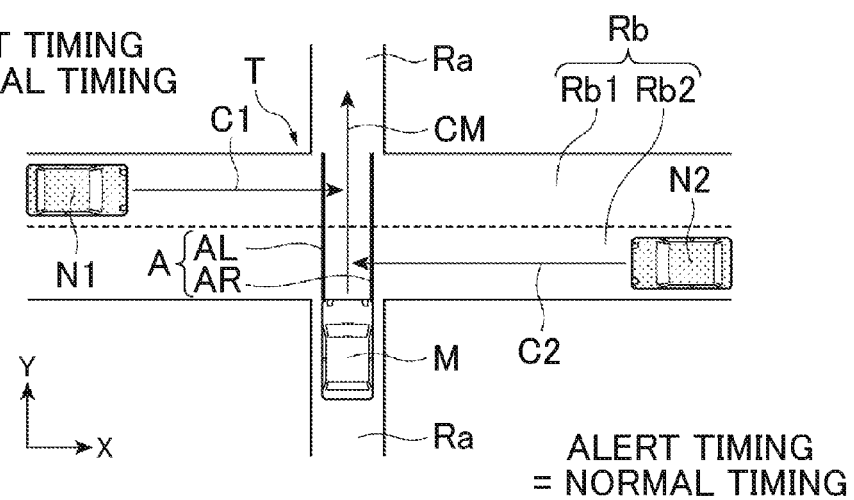

F I G . 15C
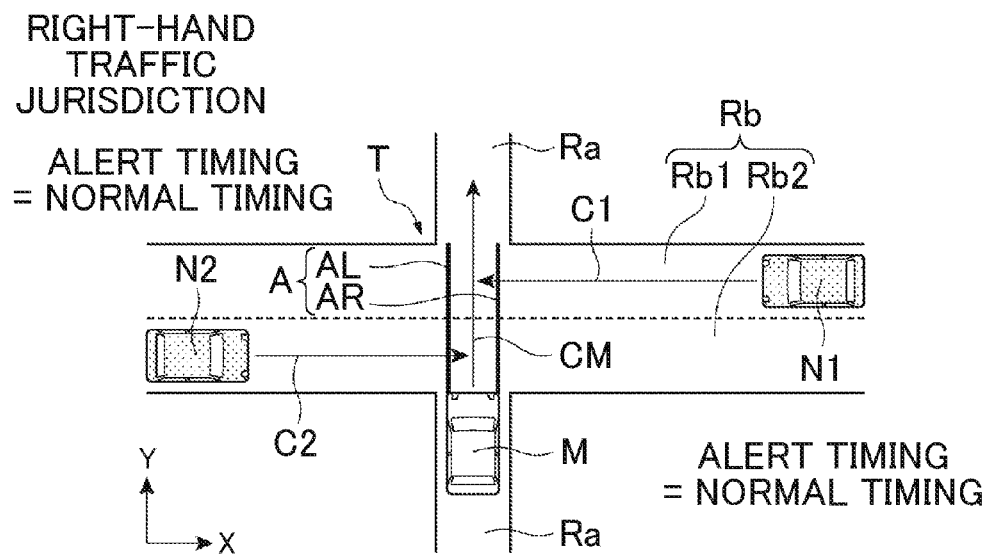

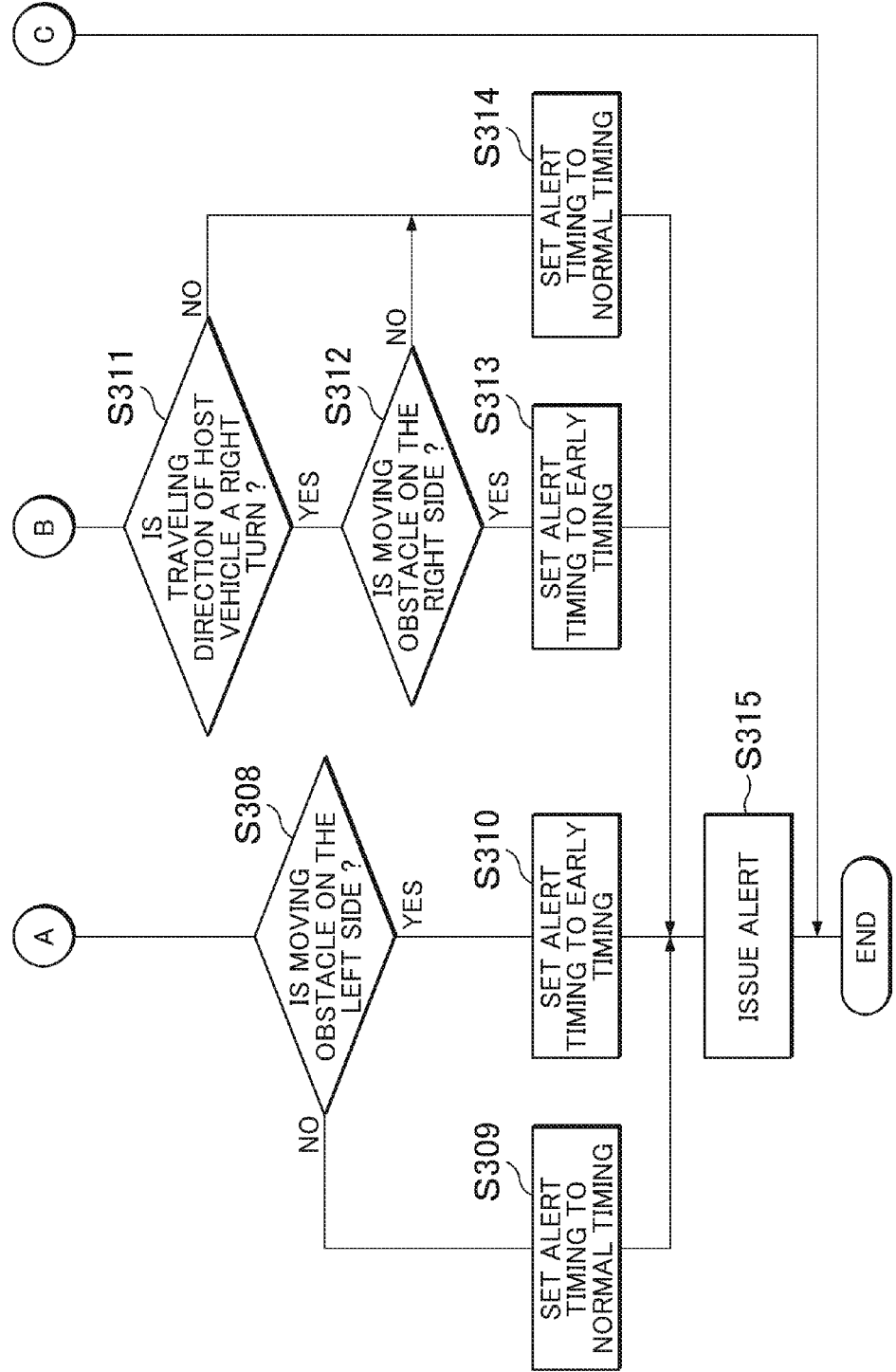

ALERTING APPARATUS

INCORPORATION BY REFERENCE

The disclosure of Japanese Patent Application No. 2014-231682 filed on Nov. 14, 2014 including the specification, drawings and abstract is incorporated herein by reference in its entirety.

BACKGROUND OF THE INVENTION

1. Field of the Invention

The invention relates to an alerting apparatus that issues an alert to a driver of a host vehicle that is entering an intersection.

2. Description of Related Art

Japanese Patent Application Publication No. 2008-242544 (JP 2008-242544 A) describes technology related to an apparatus that issues an alert to a driver of a host vehicle. JP 2008-242544 A describes an apparatus that sets a virtual safety zone that extends out in front from a perimeter of the host vehicle and alerts (i.e., warns) a driver when another vehicle enters this safety zone. Also, the technology described in JP 2008-242544 A extends the width of the safety zone to include a crosswalk (i.e., a pedestrian crossing) when the host vehicle turns right at an intersection. This safety zone is long enough to cover the entire intersection in the front-rear direction of the host vehicle.

SUMMARY OF THE INVENTION

With the apparatus described above, there may be times when, for example, at an intersection where a traveling road on which a host vehicle is traveling crosses a two-lane crossroad (i.e., a crossroad with one lane on each side) in a cross-shape, in a left-hand traffic jurisdiction, the host vehicle enters the intersection to turn left into the near lane of the crossroad from the traveling road, and another vehicle that is attempting to go through the intersection while traveling in the far lane of the crossroad enters the safety zone and an alert regarding the other vehicle is issued. However, the paths of the host vehicle that is turning left into the near lane of the crossroad and the other vehicle that is traveling in the far lane of the crossroad will not cross, so the probability that the vehicles will contact one another is low. Therefore, the driver of the host vehicle may find the alert regarding the other vehicle to be annoying.

The invention thus provides an alerting apparatus capable of inhibiting annoyance the driver by an alert at an intersection.

One aspect of the invention relates to an alerting apparatus that issues an alert regarding a moving obstacle to a driver of a host vehicle, when the host vehicle enters an intersection of a crossroad that is connected to a traveling road on which the host vehicle is traveling, and the traveling road, in a left-hand traffic jurisdiction. The alerting apparatus includes an ECU configured to determine a traveling direction of the host vehicle entering the intersection; set an intersect determination range that extends out in front of the host vehicle from the host vehicle, based on a result of the determination; obtain position information of the moving obstacle; estimate a path of the moving obstacle, based on the position information of the moving obstacle; determine whether the path of the moving obstacle intersects with the intersect determination range; issue the alert regarding the moving obstacle to the driver when it is determined that the path of the moving obstacle intersects with the intersect determination range; and set the intersect determination range to be shorter in length in a front-rear direction of the host vehicle when the traveling direction of the host vehicle is a left turn than when the traveling direction of the host vehicle is a right turn.

With the alerting apparatus according to this aspect of the invention, the intersect determination range is set shorter in length in the front-rear direction when the host vehicle that is traveling in a left-hand traffic jurisdiction turns left at the intersection, than when the host vehicle turns right at the intersection. Accordingly, with this alerting apparatus, when the host vehicle will turn left into the near lane of a two-lane crossroad, for example, it is possible to reduce the likelihood of the path of the moving obstacle traveling in the far lane of the crossroad (e.g., the path of the other vehicle) intersecting with the intersect determination range and, consequently, an alert being issued for this moving obstacle for which the host vehicle is unlikely to come into contact with, compared to when the length of the intersect determination range is not shortened. Thus, with this alerting apparatus, it is possible to inhibit annoyance to the driver by an alert at the intersection.

In the alerting apparatus according to this aspect of the invention, the ECU may be configured to set the intersect determination range to have a length in the front-rear direction that is equal to or less than one-half of a road width of the crossroad when the traveling direction of the host vehicle is a left turn.

With this alerting apparatus, when the host vehicle will turn left into the near lane of a two-lane crossroad in a left-hand traffic jurisdiction, for example, an intersect determination range having a length in the front-rear direction that is equal to or less than one-half of the road width of the crossroad is set. Therefore, with this alerting apparatus, it is possible to avoid the path of a moving obstacle traveling in the far lane of the crossroad from intersecting with the intersect determination range, and thus more appropriately inhibit annoyance to the driver by an alert at the intersection. Setting the intersect determination range to have a length in the front-rear direction that is equal to or less than one-half of the road width of the crossroad is not limited to a case in which the alerting apparatus recognizes the road width and sets the intersect determination range to be equal to or less than one-half of the road width, and may also include a case in which the alerting apparatus does not recognize the road width, and as a result, sets the intersect determination range to have a length that is equal to or less than one-half of the road width.

Another aspect of the invention relates to an alerting apparatus that issues an alert regarding a moving obstacle to a driver of a host vehicle, when the host vehicle enters an intersection of a crossroad that is connected to a traveling road on which the host vehicle is traveling, and the traveling road, in a right-hand traffic jurisdiction. The alerting apparatus includes an ECU configured to determine a traveling direction of the host vehicle entering the intersection; set an intersect determination range that extends out in front of the host vehicle from the host vehicle, based on a result of the determination; obtain position information of the moving obstacle; estimate a path of the moving obstacle, based on the position information of the moving obstacle; determine whether the path of the moving obstacle intersects with the intersect determination range; issue the alert regarding the moving obstacle to the driver when it is determined that the path of the moving obstacle intersects with the intersect determination range; and set the intersect determination range shorter in length in a front-rear direction of the host vehicle when the traveling direction of the host vehicle is a right turn than when the traveling direction of the host vehicle is a left turn.

With the alerting apparatus according to this aspect of the invention, the intersect determination range is set shorter in length in the front-rear direction when the host vehicle that is traveling in a right-hand traffic jurisdiction turns right at the intersection, than when the host vehicle turns left at the intersection. Accordingly, with this alerting apparatus, when the host vehicle will turn right into the near lane of a two-lane crossroad, for example, it is possible to reduce the likelihood of the path of the moving obstacle traveling in the far lane of the crossroad (e.g., the path of the other vehicle) intersecting with the intersect determination range and, consequently, an alert being issued for this moving obstacle for which the host vehicle is unlikely to come into contact with, compared to when the length of the intersect determination range is not shortened. Thus, with this alerting apparatus, it is possible to inhibit annoyance to the driver by an alert at the intersection.

In the alerting apparatus according to this other aspect described above, the ECU may be configured to set the intersect determination range to have a length in the front-rear direction that is equal to or less than one-half of a road width of the crossroad when the traveling direction of the host vehicle is a right turn.

With this alerting apparatus, when the host vehicle will turn right into the near lane of a two-lane crossroad in a right-hand traffic jurisdiction, for example, an intersect determination range having a length in the front-rear direction that is equal to or less than one-half of the road width of the crossroad is set. Therefore, with this alerting apparatus, it is possible to avoid the path of a moving obstacle traveling in the far lane of the crossroad from intersecting with the intersect determination range, and thus more appropriately inhibit annoyance to the driver by an alert at the intersection. Setting the intersect determination range to have a length in the front-rear direction that is equal to or less than one-half of the road width of the crossroad is not limited to a case in which the alerting apparatus recognizes the road width and sets the intersect determination range to be equal to or less than one-half of the road width, and may also include a case in which the alerting apparatus does not recognize the road width, and as a result, sets the intersect determination range to have a length that is equal to or less than one-half of the road width.

In the alerting apparatus of each of the aspects described above, the ECU may be configured to set a timing of the alert regarding the moving obstacle to an earlier timing when the moving obstacle is positioned on a left side of the host vehicle than when the moving obstacle is positioned on a right side of the host vehicle, when the traveling direction of the host vehicle is a left turn; and set the timing of the alert regarding the moving obstacle to an earlier timing when the moving obstacle is positioned on the right side of the host vehicle than when the moving obstacle is positioned on the left side of the host vehicle, when the traveling direction of the host vehicle is a right turn.

With this alerting apparatus, when the host vehicle turns left at the intersection, it is more difficult for the driver to notice a moving obstacle positioned on the left side of the host vehicle (e.g., a moving obstacle that will be traveling in the opposite direction from the host vehicle after the host vehicle turns left), than a moving obstacle positioned on the right side of the host vehicle (e.g., a moving obstacle that will be traveling in the same direction as the host vehicle after the host vehicle turns left). Therefore, when a moving obstacle for which there should be an alert (i.e., a moving obstacle with a path that intersects the intersect determination range) is positioned on the left side of the host vehicle, the timing of the alert is set to an earlier timing than when the moving obstacle is positioned on the right side of the host vehicle. Similarly, with this alerting apparatus, when the host vehicle will turn right at the intersection, the timing of an alert is set to an earlier timing when a moving obstacle for which there should be an alert is positioned on the right side of the host vehicle than when the moving obstacle is positioned on the left side of the host vehicle. Therefore, with this alerting apparatus, the driver of the host vehicle that will turn left or right can be made aware early on of a moving obstacle positioned in a direction where the driver may not easily notice it.

Still another aspect of the invention relates to an alerting apparatus that issues an alert regarding a moving obstacle to a driver of a host vehicle, when the host vehicle enters an intersection of a crossroad that is connected to a traveling road on which the host vehicle is traveling, and the traveling road. The alerting apparatus includes an ECU configured to determine a traveling direction of the host vehicle entering the intersection; obtain position information of the moving obstacle; estimate a path of the moving obstacle, based on the position information of the moving obstacle; determine whether the path of the moving obstacle intersects with a preset intersect determination range that extends out in front of the host vehicle from the host vehicle; issue the alert regarding the moving obstacle to the driver when it is determined that the path of the moving obstacle intersects with the intersect determination range; set a timing of the alert regarding the moving obstacle to an earlier timing when the moving obstacle is positioned on a left side of the host vehicle than when the moving obstacle is positioned on a right side of the host vehicle, when the traveling direction of the host vehicle is a left turn; and set the timing of the alert regarding the moving obstacle to an earlier timing when the moving obstacle is positioned on the right side of the host vehicle than when the moving obstacle is positioned on the left side of the host vehicle, when the traveling direction of the host vehicle is a right turn.

With the alerting apparatus according to this aspect of the invention, when the host vehicle turns left at the intersection, it is more difficult for the driver to notice a moving obstacle positioned on the left side of the host vehicle (e.g., a moving obstacle that will be traveling in the opposite direction from the host vehicle after the host vehicle turns left), than a moving obstacle positioned on the right side of the host vehicle (e.g., a moving obstacle that will be traveling in the same direction as the host vehicle after the host vehicle turns left). Therefore, when a moving obstacle for which there should be an alert (i.e., a moving obstacle with a path that intersects the intersect determination range) is positioned on the left side of the host vehicle, the timing of the alert is set to an earlier timing than when the moving obstacle is positioned on the right side of the host vehicle. Similarly, with this alerting apparatus, when the host vehicle will turn right at the intersection, the timing of an alert is set to an earlier timing when a moving obstacle for which there should be an alert is positioned on the right side of the host vehicle than when the moving obstacle is positioned on the left side of the host vehicle. Therefore, with this alerting apparatus, the driver of the host vehicle that will turn left or right can be made aware early on of a moving obstacle positioned in a direction where the driver may not easily notice it.

Thus, the alerting apparatus according to each of the aspects of the invention described above is able to inhibit annoyance the driver by an alert at an intersection.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14C is a plan view showing the timings of alerts of other vehicles, when the traveling direction at the intersection of the host vehicle traveling in a left-hand traffic jurisdiction is straight ahead;

FIG. 15C is a plan view showing the timings of alerts of other vehicles, when the traveling direction at the intersection of the host vehicle traveling in a right-hand traffic jurisdiction is straight ahead;

FIG. 16B is a flowchart illustrating alert control in the alerting apparatus according to the second example embodiment;

DETAILED DESCRIPTION OF EMBODIMENTS

Hereinafter, example embodiments of the invention will be described in detail with reference to the accompanying drawings.

Figure 1:
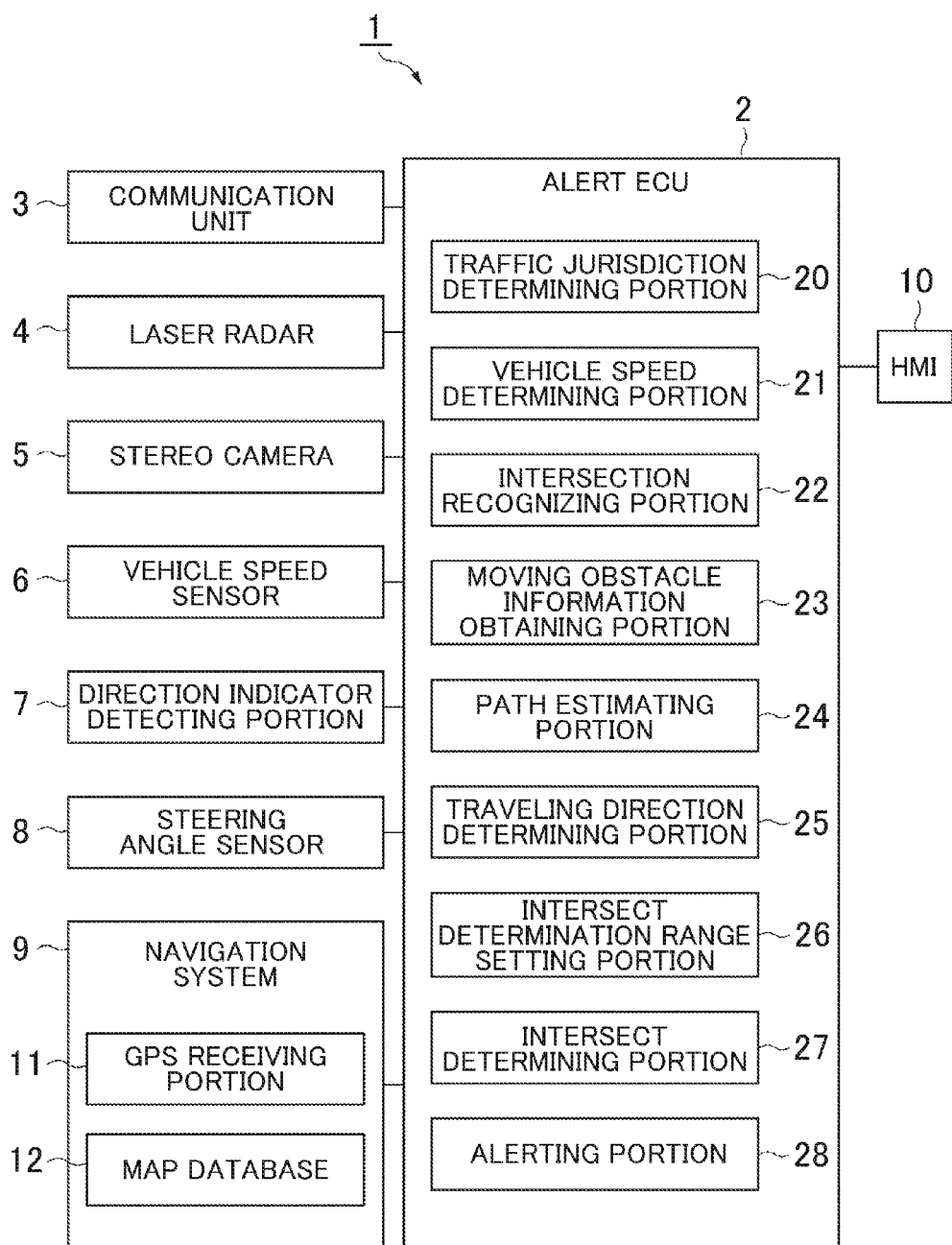
FIG. 1 is a block diagram of an alerting apparatus according to a first example embodiment of the invention.

FIG. 1 is a block diagram of an alerting apparatus according to a first example embodiment of the invention. The alerting apparatus 1 shown in FIG. 1 is mounted in a host vehicle such as a passenger vehicle, for example, and issues an alert regarding a moving obstacle to a driver of the host vehicle. A moving obstacle is, for example, an obstacle that is able to move, such as another vehicle, a pedestrian, or a bicycle or the like. Another vehicle may also include a two-wheeled vehicle as well as a four-wheeled vehicle. The alert regarding a moving obstacle is, for example, processing that calls the driver's attention to the moving obstacle by audio output from a speaker in the host vehicle, or an image display on a display in the host vehicle. An alert regarding a moving obstacle may also be issued by both audio output and an image display. More specifically, the alerting apparatus 1 may convey an approaching direction of a moving obstacle to the driver by audio output, or may indicate to the driver a position or the like of the moving obstacle by an image display on a display, as the alert regarding the moving obstacle.

The alerting apparatus 1 issues an alert regarding the moving obstacle when the host vehicle enters an intersection. An intersection in this case is a location where a traveling road on which the host vehicle is traveling crosses a crossroad that intersects the traveling road, for example. An intersection includes a crossroads intersection and a T-intersection, for example. A crossroads intersection is an intersection where the traveling road and the crossroad cross in a cross-shape, for example. A T-intersection is an intersection where an end of the traveling road is connected in a T-shape midway in the crossroad, for example. At the intersection, the traveling road and the crossroad do not have to be orthogonal, and may intersect at an angle. The intersection is not limited to a crossroads intersection and a T-intersection. Also, the intersection includes an intersection formed in a facility such as a parking lot. That is, the traveling road and the crossroad may also include a road in a facility such as a parking lot. The crossroad is connected to the traveling road, so the intersection does not include a grade separated crossing (an interchange) in which the crossroad is not connected to the traveling road. The alerting apparatus 1 does not necessarily have to recognize the intersection.

An example of when the host vehicle enters the intersection is when the host vehicle has crossed a stop line provided right before the intersection on the traveling road. When the host vehicle enters the intersection may also be when the distance between the host vehicle and a stop line right before the intersection has become equal to or less than a preset distance (e.g., 2 meters). The preset distance may be an arbitrary distance. When the host vehicle enters the intersection may be when the host vehicle on a traveling road enters an area where the traveling road overlaps with the crossroad. The alerting apparatus 1 does not necessarily have to recognize when the host vehicle enters an intersection.

When it is determined that the vehicle speed of the host vehicle is equal to or less than a preset vehicle speed threshold value, the alerting apparatus 1 assumes that the host vehicle will enter an intersection and starts processing an alert at the intersection. The alerting apparatus 1 determines whether the vehicle speed of the host vehicle is equal to or less than the preset vehicle speed threshold value based on a detection result from a vehicle speed sensor, for example. The preset vehicle speed threshold value is not particularly limited, but is 10 km/h, for example. The vehicle speed threshold value may be any value between 5 km/h and 25 km/h, inclusive. The vehicle speed threshold value may be a fixed value or a varying value.

Alternatively, the alerting apparatus 1 may determine whether the distance between the intersection and the host vehicle on the traveling road is equal to or less than a preset distance threshold value based on map information and position information of the host vehicle. When it is determined that the distance between the host vehicle and the intersection is equal to or less than the preset distance threshold value, the alerting apparatus 1 recognizes that the host vehicle is entering an intersection and starts processing an alert at the intersection. In this case, the alerting apparatus 1 does not necessarily have to determine whether the vehicle speed of the host vehicle is equal to or less than the vehicle speed threshold value. The preset distance threshold value is not particularly limited, and may be any appropriate value between 1.5 meters and 2.5 meters, inclusive, for example. The distance threshold value may be a fixed value or a varying value.

Also, the alerting apparatus 1 determines whether a moving obstacle that will be an alert candidate is present. The alerting apparatus 1 obtains the position information of the moving obstacle based on obstacle information from radar, for example. The alerting apparatus 1 estimates the path of the moving obstacle based on a change over time in the position information of the moving obstacle. The alerting apparatus 1 recognizes a moving obstacle that is moving in a direction toward the host vehicle as an alert candidate, for example. The alerting apparatus 1 may also recognize all moving obstacles for which position information is obtained as alert candidates.

The alerting apparatus 1 determines the traveling direction of the host vehicle based on the detection results from a direction indicator detecting portion of the host vehicle, for example. The alerting apparatus 1 determines the traveling direction of the host vehicle when the vehicle speed of the host vehicle is equal to or less than the vehicle speed threshold value, and it is determined that a moving obstacle that will be an alert candidate is present. Alternatively, the alerting apparatus 1 may determine the traveling direction of the host vehicle when it is determined that the host vehicle is entering an intersection based on the map information and the position information of the host vehicle, and it is determined that a moving obstacle that will be an alert candidate is present. The traveling direction of the host vehicle is a left turn, a right turn, or straight ahead at an intersection, for example.

When the alerting apparatus 1 determines that the host vehicle is entering an intersection based on the map information and the position information of the host vehicle, it is unlikely that this will be confused with the vehicle traveling around a curve, so the traveling direction of the host vehicle may also be determined based on a steering angle of the host vehicle. In this case, the alerting apparatus 1 determines that the traveling direction of the host vehicle is a right turn, when a right steering angle of the host vehicle is equal to or greater than a preset right threshold value, for example. The alerting apparatus 1 determines that the traveling direction of the host vehicle is a left turn, when a left steering angle of the host vehicle is equal to or greater than a preset left threshold value, for example.

The alerting apparatus 1 sets an intersect determination range that extends in front of the host vehicle, based on the determination result of the traveling direction of the host vehicle. The intersect determination range is a range that is used to determine whether a moving obstacle that is an alert target for which an alert should be issued to the driver of the host vehicle is present. This intersect determination range will be described in detail later. The alerting apparatus 1 estimates the path of a moving obstacle that is an alert candidate, based on a change over time in the position information of a moving obstacle recognized as an alert candidate, for example. When the alerting apparatus 1 has determined that the path of the moving obstacle that is an alert candidate intersects with the intersect determination range, the alerting apparatus 1 recognizes this moving obstacle as an alert target. The alerting apparatus 1 then issues an alert regarding the moving obstacle recognized as an alert target to the driver.

Figure 2A:
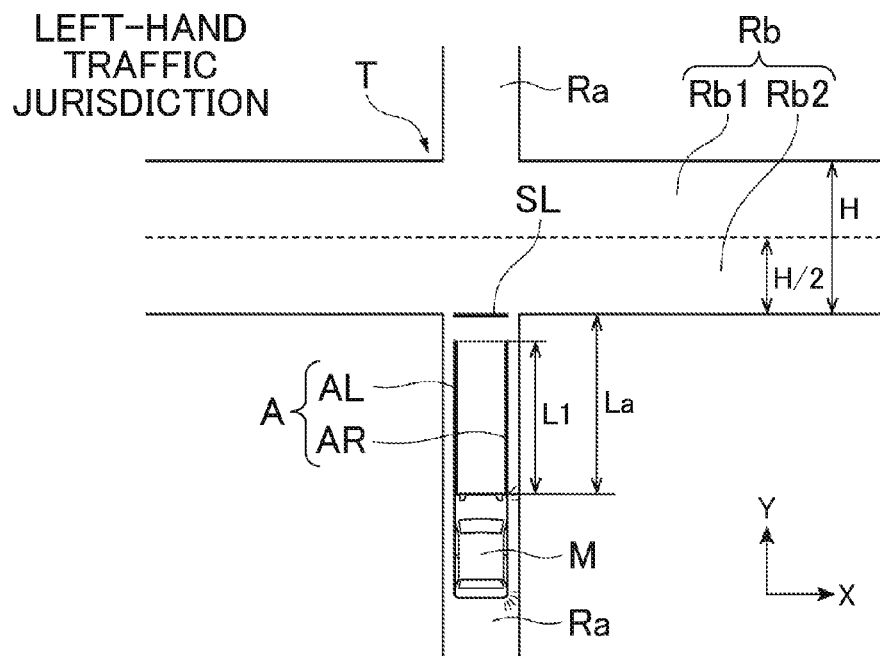
FIG. 2A is a plan view of a setting of an intersect determination range when the traveling direction at an intersection of a host vehicle traveling in a left-hand traffic jurisdiction is a right turn.

Hereinafter, the setting of the intersect determination range, and the determination of intersection between the path of the moving obstacle and the intersect determination range, will be described with reference to the drawings. FIG. 2A is a plan view showing the setting of an intersect determination range when the traveling direction at an intersection of the host vehicle traveling in a left-hand traffic jurisdiction is a right turn. A left-hand traffic jurisdiction is a region or country where a vehicle must travel on the left-hand side of the road (i.e., to the left of the center of the road).

In FIG. 2A, the intersection is denoted by reference character T, the traveling road is denoted by reference character Ra, the crossroad is denoted by reference character Rb, the far lane of the crossroad Rb viewed from the host vehicle is denoted by reference character Rb1, the near lane of the crossroad Rb viewed from the host vehicle is denoted by reference character Rb2, and the host vehicle is denoted by reference character M. Also, the intersect determination range set by the host vehicle M is denoted by reference character A. Further, an XY coordinate system is shown in which a width direction of the host vehicle M is an X axis direction, and a front-rear direction of the host vehicle M is a Y axis direction. The intersection T shown in FIG. 2A is a crossroads intersection in which the traveling road Ra that extends in the Y axis direction crosses the crossroad Rb that extends in the X axis direction in a cross shape. The traveling road Ra shown in FIG. 2A is a minor road (i.e., a non-priority road), and the crossroad Rb is a major road (i.e., a through road or priority road).

As shown in FIG. 2A, the alerting apparatus 1 sets an intersect determination range A of a length L1 when the traveling direction of the host vehicle M that will enter the intersection T is a right turn (e.g., when the direction indicator is illuminated on the right side).

A distance La shown in FIG. 2A is a distance between the host vehicle M when the alerting apparatus 1 sets the intersect determination range A, and a stop line SL at an entrance to the intersection T. This distance La corresponds to the distance threshold value described above. That is, when it is determined that the distance between the host vehicle M and the intersection T is equal to or less than the preset distance threshold value La, the alerting apparatus 1 may determine the traveling direction of the host vehicle M and set the intersect determination range. The alerting apparatus 1 does not necessarily have to use the distance threshold value La, and may determine the traveling direction of the host vehicle M and set the intersect determination range when the vehicle speed of the host vehicle M is equal to or less than the vehicle speed threshold value.

The intersect determination range A includes a left determination range AL that extends forward from a left front end of the host vehicle M, and a right determination range AR that extends forward from a right front end of the host vehicle M, for example. The left determination range AL and the right determination range AR are linear ranges that are parallel to one another. The shape of the intersect determination range A is not limited to the shape shown in FIG. 2A. The shape of the intersect determination range A may be a linear range that extends forward from the center of the front end of the host vehicle M, or a rectangular range that extends forward from the front end of the host vehicle M. Also, the left determination range AL may be set so as to extend forward from a position offset in the vehicle width direction from a left front end of the host vehicle M, and the right determination range AR may be set so as to extend forward from a position offset in the vehicle width direction from a right front end of the host vehicle M. The same also applies to an intersect determination range B that will be described later.

The length L1 shown in FIG. 2A is a length of the intersect determination range A in the front-rear direction of the host vehicle M (i.e., the Y axis direction). The length L1 may be any suitable length between 6 and 8 meters, inclusive, for example. The length L1 may be a fixed value or a varying value. The length L1 may also be a length that is the same as a road width H of the crossroad Rb, or that exceeds the road width H, when the alerting apparatus 1 is able to recognize the road width H. The length L1 may also be set to a length that is less than the road width H of the crossroad Rb. Also, when the length L1 is a variable value, the alerting apparatus 1 may recognize the road width H of the crossroad Rb based on the map information or image information from a camera, and set the intersect determination range A to the length L1 that is equal to or greater than the road width H. Even if the road width H of the crossroad Rb is unable to be obtained, when the alerting apparatus 1 has recognized a plurality of lanes (i.e., a plurality of lanes on one side) of the crossroad Rb, the alerting apparatus 1 may increase the length L1 as the number of lanes increases. Also, even if the alerting apparatus 1 has finished setting the intersect determination range A, the alerting apparatus 1 may change the intersect determination range A such that the length L1 increases as the vehicle speed of the host vehicle M increases.

Figure 2B:
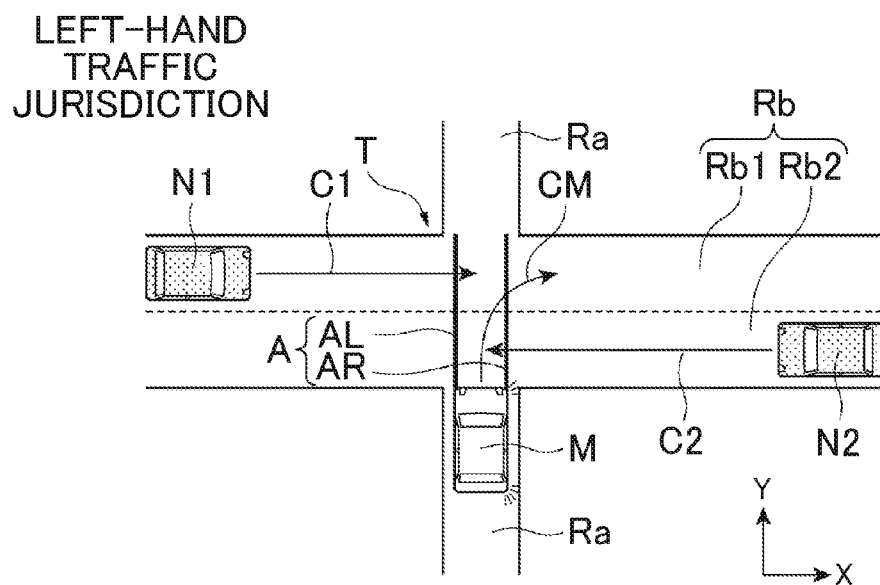
FIG. 2B is a plan view illustrating the relationship between the intersect determination range when the host vehicle will turn right at the intersection in a left-hand traffic jurisdiction, and the path of another vehicle.

FIG. 2B is a plan view illustrating the relationship between the intersect determination range when the host vehicle M will make a right turn in a left-hand traffic jurisdiction, and the path of another vehicle. In FIG. 2B, the far lane of the crossroad Rb viewed from the host vehicle M is denoted by reference character Rb1, and the near lane with respect to the host vehicle M is denoted by reference character Rb2. Also, another vehicle traveling in the far lane Rb1 is denoted by reference character N1, and another vehicle traveling in the near lane Rb2 is denoted by reference character N2. The path of the host vehicle M that turns right at the intersection T is denoted by reference character CM, the path of the other vehicle N1 is denoted by reference character C1, and the path of the other vehicle N2 is denoted by reference character N2.

The alerting apparatus 1 determines whether the intersect determination range A and the path C1 of the other vehicle N1 intersect. As shown in FIG. 2B, the intersect determination range A of the length L1 is the same length as the road width H of the crossroad Rb, so the intersect determination range A extends across both the far lane Rb1 and the near lane Rb2 of the crossroad Rb in the front-rear direction of the host vehicle M. This intersect determination range A intersects with both of the paths C1 and C2 of the other vehicles N1 and N2 traveling on the crossroad Rb. The alerting apparatus 1 determines that the left determination range AL of the intersect determination range A and the path C1 of the other vehicle N1 on the left side of the host vehicle M intersect, and thus sets the other vehicle N1 as an alert target and issues an alert to the driver. The alerting apparatus 1 determines that the right determination range AR of the intersect determination range A and the path C2 of the other vehicle N2 on the right side of the host vehicle M intersect, and thus sets the other vehicle N2 as an alert target and issues an alert to the driver. The alerting apparatus 1 does not necessarily have to divide the intersect determination range into left and right ranges.

Figure 3A:
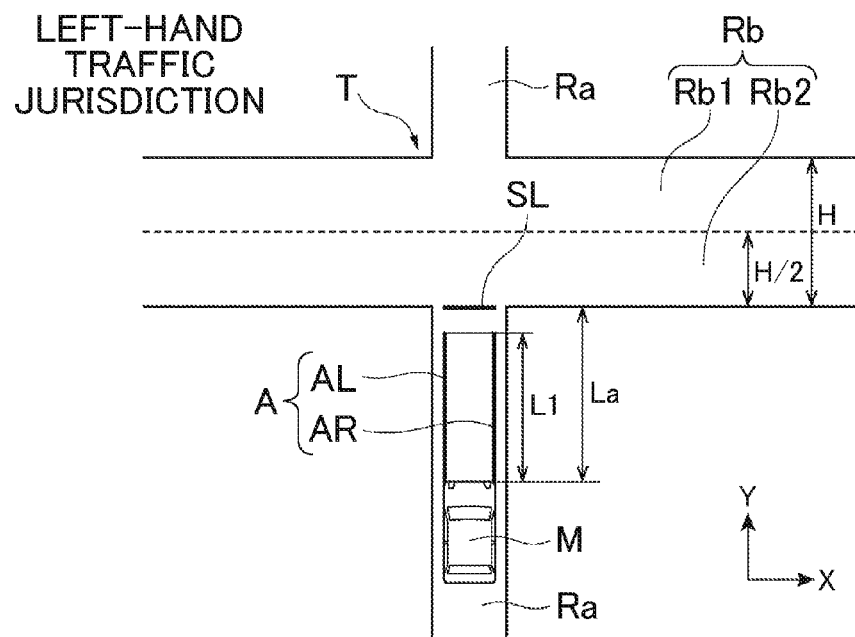
FIG. 3A is a plan view of a setting of the intersect determination range when the traveling direction at the intersection of the host vehicle traveling in a left-hand traffic jurisdiction is straight ahead.

FIG. 3A is a plan view of a setting of the intersect determination range A when the traveling direction at the intersection T of the host vehicle M traveling in a left-hand traffic jurisdiction is straight ahead. As shown in FIG. 3A, the alerting apparatus 1 sets the intersect determination range A of the length L1 even when the host vehicle M is traveling straight ahead. The alerting apparatus 1 may also change the shape (including the length) of the intersect determination range depending on whether the traveling direction of the host vehicle M is straight ahead or a right turn.

Figure 3B:
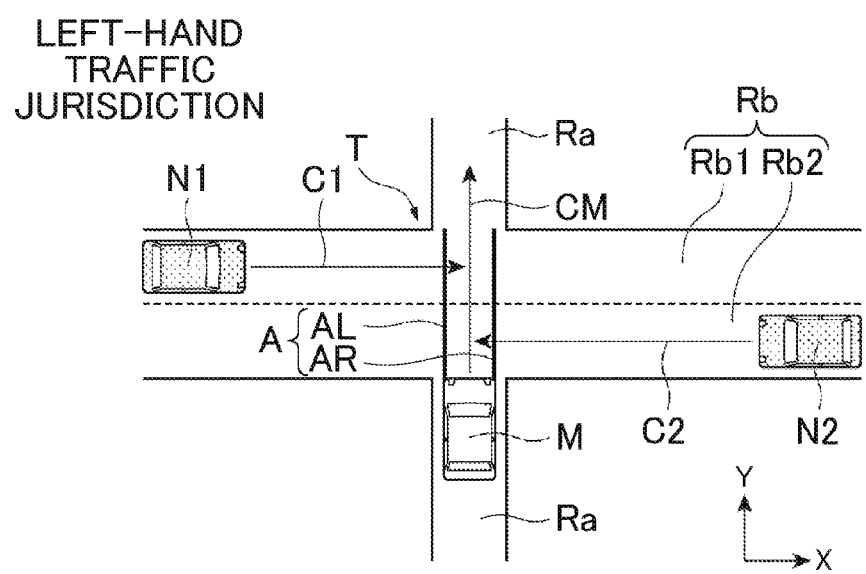
FIG. 3B is a plan view illustrating the relationship between the intersect determination range when the host vehicle travels straight at the intersection in a left-hand traffic jurisdiction, and the path of another vehicle.

FIG. 3B is a plan view illustrating the relationship between the intersect determination range when the host vehicle M travels straight at the intersection T in a left-hand traffic jurisdiction, and the path of another vehicle. In FIG. 3B, a path CM of the host vehicle M is a path that passes straight through the intersection. In the scenario shown in FIG. 3B, the alerting apparatus 1 determines that the intersect determination range A and the paths C1 and C2 of the other vehicles N1 and N2 intersect, and thus sets the other vehicles N1 and N2 as alert targets and issues alerts to the driver.

Figure 4A:
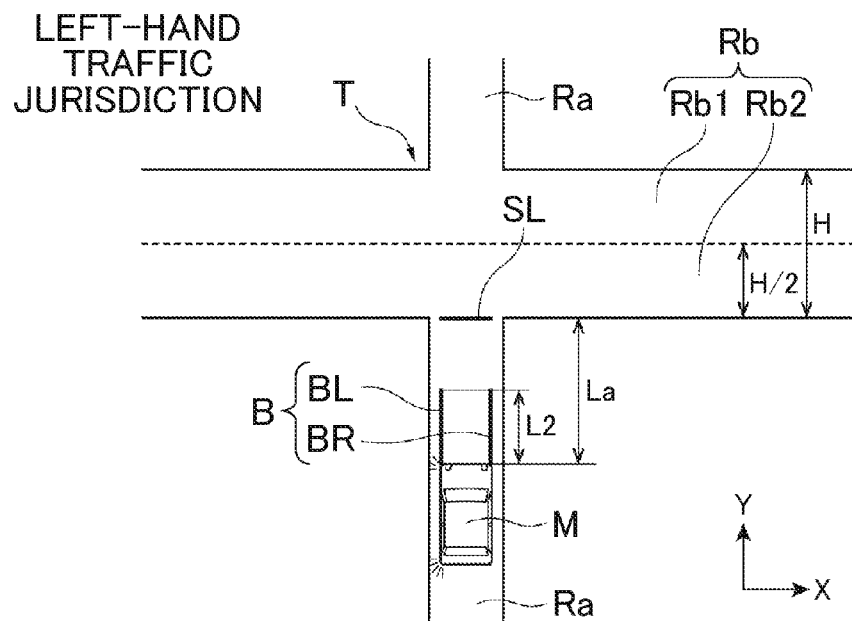
FIG. 4A is a plan view of a setting of the intersect determination range when the traveling direction at an intersection of the host vehicle traveling in a left-hand traffic jurisdiction is a left turn.

FIG. 4A is a plan view of a setting of the intersect determination range when the traveling direction at an intersection T of the host vehicle M traveling in a left-hand traffic jurisdiction is a left turn. As shown in FIG. 4A, when the traveling direction of the host vehicle M is a left turn, the alerting apparatus 1 sets an intersect determination range B of a length L2. The intersect determination range B includes, for example, a left determination range BL that extends forward from a left front end of the host vehicle M, and a right determination range BR that extends forward from a right front end of the host vehicle M. The intersect determination range B shown in FIG. 4A is shorter in the front-rear direction of the host vehicle M than the intersect determination range A shown in FIGS. 2A and 3A. That is, when the traveling direction of the host vehicle M is a left turn in a left-hand traffic jurisdiction, the alerting apparatus 1 sets an intersect determination range that is shorter in length than when the traveling direction of the host vehicle M is a right turn or straight ahead. The intersect determination range B may also have a different shape than the intersect determination range A.

The length L2 is a length that is shorter than the length L1. The length L2 may be set to an appropriate length between 3 and 5 meters, inclusive, for example. The length L2 may be a fixed value or a variable value. The length L2 may be a length obtained by subtracting a predetermined length from the length L1. The preset length may be set to an appropriate length between 1 and 5 meters, inclusive, for example.

Also, when the alerting apparatus 1 is able to recognize the road width H of the crossroad Rb based on map information, wireless communication (e.g., roadside-to-vehicle communication, vehicle-to-vehicle communication, or pedestrian-to-vehicle communication), or image information from a camera, the alerting apparatus 1 may also set a length that is shorter than the length L1 and shorter than the road width H of the crossroad Rb, as the length L2. The alerting apparatus 1 may also set a length that is the same as one-half the road width H (i.e., H/2) of the crossroad Rb, or a length that is less than one-half the road width H, for example, as the length L2. That is, the alerting apparatus 1 may set an intersect determination range B of the length L2 that is equal to or less than the road width H/2. When the length L2 is a value that varies according to the road width H, the alerting apparatus 1 may set a minimum value (e.g., the vehicle width of the host vehicle M+1 meter) that enables the length L2 to be shortened. Even if the road width H of the crossroad Rb is unable to be recognized, when the number of lanes of the crossroad Rb is able to be recognized, the alerting apparatus 1 may shorten the length L2 when there are fewer lanes. Also, even after the intersect determination range B is set, the alerting apparatus 1 may change the intersect determination range B such that the length L2 becomes longer as the vehicle speed of the host vehicle M increases. In this case as well, the length L2 is shorter than the length L1 under the same conditions.

Figure 4B:
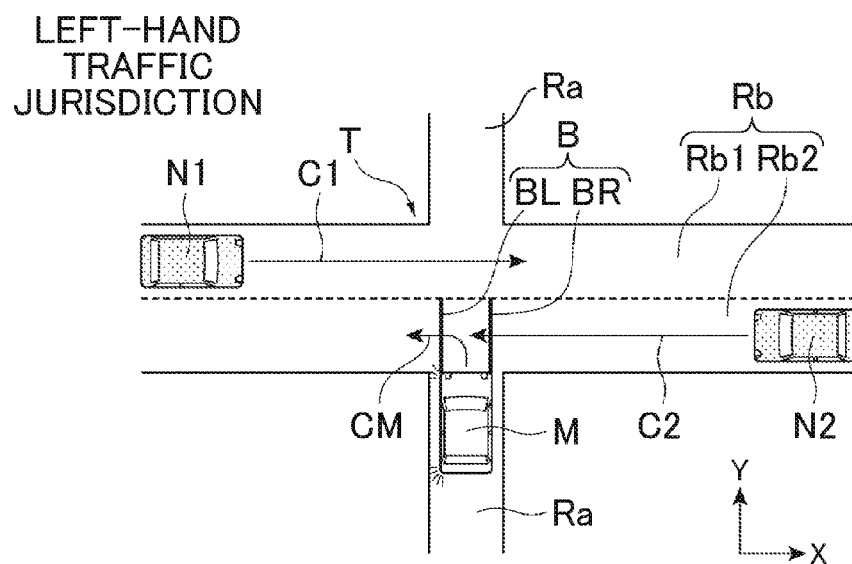
FIG. 4B is a plan view illustrating the relationship between the intersect determination range when the host vehicle will turn left at the intersection in a left-hand traffic jurisdiction, and the path of another vehicle.

FIG. 4B is a plan view illustrating the relationship between the intersect determination range when the host vehicle M turns left at the intersection T in a left-hand traffic jurisdiction, and the path of another vehicle. In FIG. 4B, the path CM of the host vehicle M is a path that turns to the left. The path CM is a path whereby the host vehicle M will enter the near lane Rb2 of the crossroad Rb from the traveling road Ra, but does not reach the far lane Rb1. As shown in FIG. 4B, the intersect determination range B of the length L2 is a length equal to or less than the road width H/2 of the crossroad Rb, and thus does not reach the far lane Rb1 of the crossroad Rb. Therefore, the path C2 of the other vehicle N2 traveling in the near lane Rb2 intersects with the intersect determination range B, but the path C1 of the other vehicle N1 traveling in the far lane Rb1 does not intersect with the intersect determination range B. In this case, the alerting apparatus 1 sets only the other vehicle N2 having the path C2 that intersects with the intersect determination range B as the alert target and issues an alert to the driver. As a result, the alerting apparatus 1 is able to avoid alerting the driver of the other vehicle N1 in the far lane Rb1 with which there is little possibility of contact because the path CM of the host vehicle M does not intersect with the path C1 of the other vehicle N1.

Figure 5A:
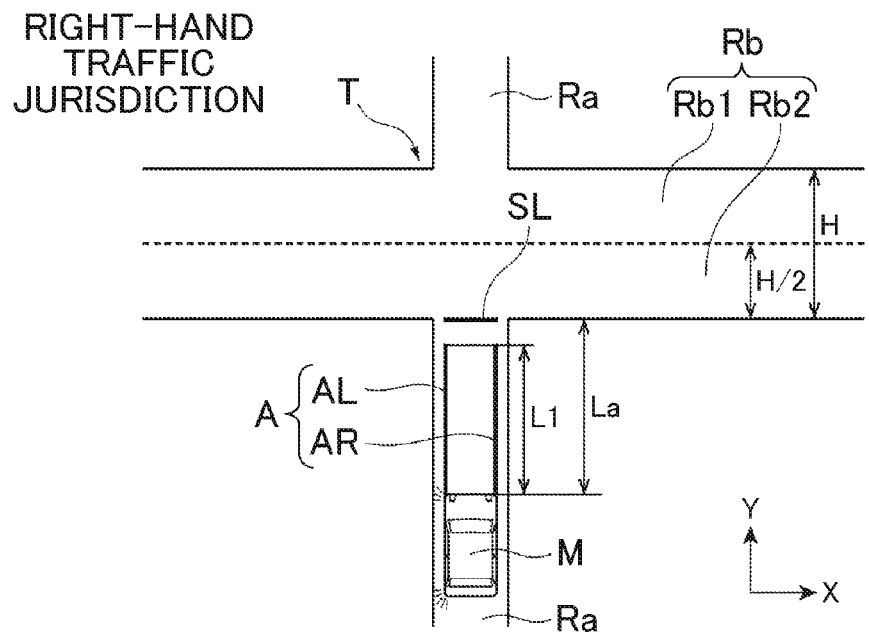
FIG. 5A is a plan view of a setting of the intersect determination range when the traveling direction at the intersection of the host vehicle traveling in a right-hand traffic jurisdiction is a left turn.

Continuing on, FIG. 5A is a plan view of a setting of the intersect determination range A when the traveling direction at the intersection T of the host vehicle M traveling in a right-hand traffic jurisdiction is a left turn. FIG. 5A is a view of the same scenario as that shown in FIG. 4A, with the exception of the right-hand traffic jurisdiction. When the host vehicle M is traveling in a right-hand traffic jurisdiction, the alerting apparatus 1 sets the intersect determination range A of the length L1 even when the traveling direction of the host vehicle M is a left turn. A right-hand traffic jurisdiction is a region or country where the vehicle must travel on the right-hand side of the road (i.e., to the right of the center of the road).

Figure 5B:
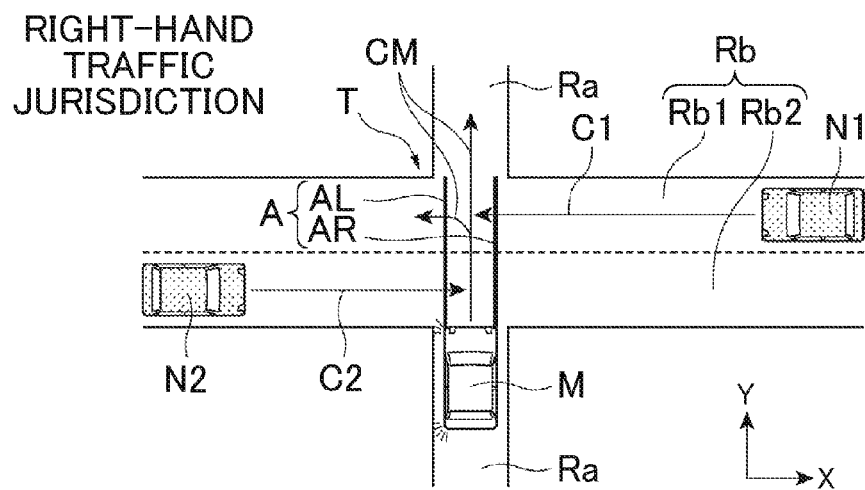
FIG. 5B is a plan view illustrating the relationship between the intersect determination range when the host vehicle will turn left or travel straight at the intersection in a right-hand traffic jurisdiction, and the path of another vehicle.

FIG. 5B is a plan view illustrating the relationship between the intersect determination range when the host vehicle M turns left or travels straight at the intersection T in a right-hand traffic jurisdiction, and the path of another vehicle. As shown in FIG. 5B, the alerting apparatus 1 sets the other vehicles N1 and N2 as alert targets and issues alerts to the driver, because both the path C1 of the other vehicle N1 traveling in the far lane Rb1 and the path C2 of the other vehicle N2 traveling in the near lane Rb2 intersect with the intersect determination range A.

Figure 6A:
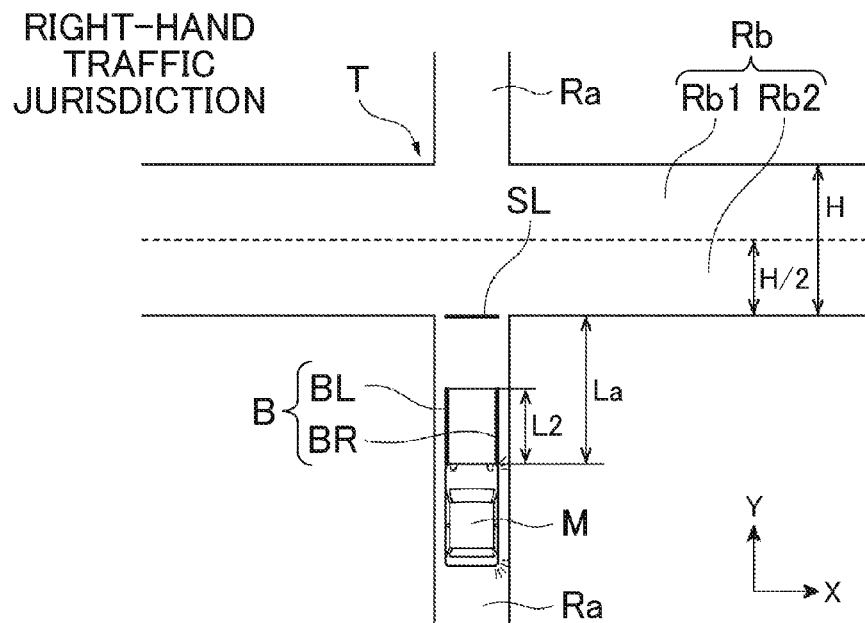
FIG. 6A is a plan view of a setting of the intersect determination range when the traveling direction at the intersection of the host vehicle traveling in the right-hand traffic jurisdiction is a right turn.

FIG. 6A is a plan view of a setting of the intersect determination range B when the traveling direction at the intersection T of the host vehicle M traveling in the right-hand traffic jurisdiction is a right turn. As shown in FIG. 6A, when the host vehicle M traveling in a right-hand traffic jurisdiction will turn right, the alerting apparatus 1 sets the intersect determination range B of the length L2. That is, when the traveling direction of the host vehicle M in a right-hand traffic jurisdiction is a right turn, the alerting apparatus 1 sets an intersect determination range that is of a shorter length than when the traveling direction of the host vehicle M is straight ahead or a right turn.

Figure 6B:
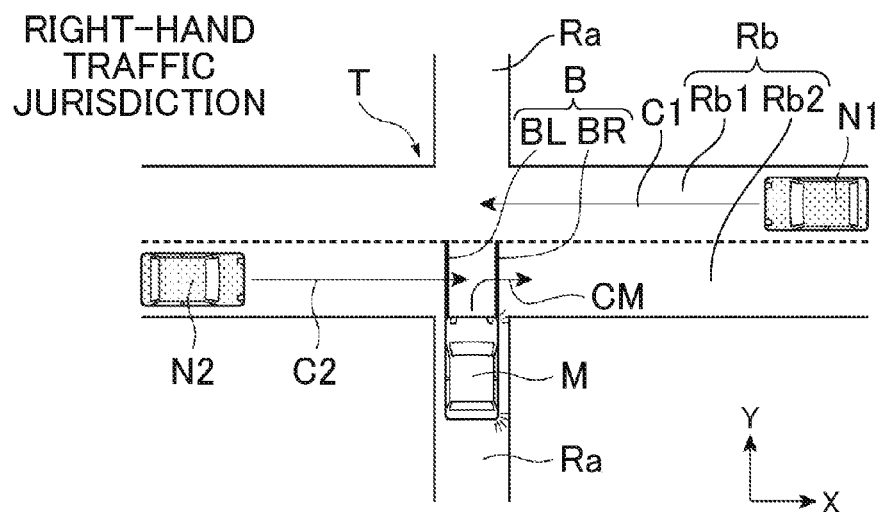
FIG. 6B is a plan view illustrating the relationship between the intersect determination range when the host vehicle will turn right at the intersection in a right-hand traffic jurisdiction, and the path of another vehicle.

FIG. 6B is a plan view illustrating the relationship between the intersect determination range when the host vehicle M turns right at the intersection T in a right-hand traffic jurisdiction, and the path of another vehicle. As shown in FIG. 6B, the intersect determination range B of the length L2 is a length that is equal to or less than the road width H/2 of the crossroad Rb, and thus does not reach to the far lane Rb1 of the crossroad Rb. The alerting apparatus 1 sets only the other vehicle N2 having the path C2 that intersects the intersect determination range B as the alert target and issues an alert to the driver.

The length L2 does not necessarily have to be a length equal to or less than the road width H/2. For example, if the length L2 of the four-lane crossroad Rb (i.e., two lanes on each side) is equal to or less than ¾ of the road width H, the intersect determination range B is able to at least avoid intersecting with the path of another vehicle traveling in the farthest lane of the crossroad Rb from the host vehicle M, so unnecessary alerts are able to be inhibited. Also, the length L2 is shorter than the length L1 of the intersect determination range A in the intersection T, and is thus at least shorter than the road width H. Therefore, by setting the intersect determination range B of the length L2, the alerting apparatus 1 is able to avoid having a vehicle traveling at an end portion of the far lane Rb1 of the crossroad Rb being set as an alert target, and is thus able to inhibit an alert that is unnecessary for the driver, compared to when the intersect determination range A is set.

The alerting apparatus 1 does not necessarily have to be configured to support both a left-hand traffic jurisdiction and a right-hand traffic jurisdiction, and may instead be configured to support only one type of jurisdiction, i.e., either a left-hand traffic jurisdiction or a right-hand traffic jurisdiction. Also, a case in which the moving obstacle is another vehicle (i.e., the other vehicles N1 and N2) on the crossroad Rb is given as an example, but the moving obstacle does not have to be another vehicle. That is, the moving obstacle may also be a pedestrian or a bicycle. When the path of a pedestrian or a bicycle traveling along the crossroad Rb intersects with the intersect determination range, the alerting apparatus 1 recognizes the pedestrian or bicycle as an alert target.

Hereinafter, the structure of the alerting apparatus 1 according to the first example embodiment will be described with reference to the drawings. As shown in FIG. 1, the alerting apparatus 1 includes an alert ECU (Electronic Control Unit) 2 that controls the running of the host vehicle M. This alert ECU 2 is an electronic control unit that includes a CPU (Central Processing Unit), ROM (Read Only Memory), and RAM (Random Access Memory) and the like. The alert ECU 2 executes various types of vehicle control by loading programs stored in the ROM into the RAM, and executing these programs with the CPU. The alert ECU 2 may also be formed by a plurality of electronic control units. Also, some of the functions of the alert ECU 2 described below may be executed in a computer at a facility such as an information management center capable of communicating with the host vehicle M.

The alert ECU 2 is connected to a communication unit 3, a laser radar 4, a stereo camera 5, a vehicle speed sensor 6, a direction indicator detecting portion 7, a steering angle sensor 8, a navigation system 9, and an HMI (Human Machine Interface) 10.

The communication unit 3 obtains various information via a wireless communication network (such as a mobile phone communication network or a communication network such as VICS (registered trademark) (Vehicle Information and Communication System) or the like). The communication unit 3 obtains road environment information about the traveling road Ra via roadside-to-vehicle communication with a computer at a facility such as an information management center that manages traffic information, for example. Roadside-to-vehicle communication is communication between a vehicle and an information management center or the like via a roadside transmitter (such as an optical beacon, or an ITS (Intelligent Transport Systems) spot or the like) provided on the side of the road, for example. Roadside-to-vehicle communication also includes communication between a vehicle and an information management center or the like via the wireless communication network described above.

Also, the communication unit 3 may obtain information about another vehicle by vehicle-to-vehicle communication. The communication unit 3 obtains position information of the other vehicle and road environment information detected by the other vehicle and the like, via vehicle-to-vehicle communication, for example. Also, the communication unit 3 may obtain information about a pedestrian or the driver of the host vehicle via pedestrian-to-vehicle communication. Pedestrian-to-vehicle communication is wireless communication between the host vehicle M and a mobile information terminal (e.g., a smartphone, a tablet terminal, or a notebook computer or the like) carried by the pedestrian or the driver of the host vehicle. The communication unit 3 performs pedestrian-to-vehicle communication via the wireless communication network described above, for example. The communication unit 3 transmits the information of the obtained communication results to the alert ECU 2.

The laser radar 4 is provided on a front end of the host vehicle M, for example, and detects an obstacle in front of the vehicle using radar. The laser radar 4 detects an obstacle by transmitting a laser out in front of the host vehicle M, and receiving the laser reflected off of an obstacle such as another vehicle. The laser radar 4 outputs obstacle information related to the detected obstacle to the alert ECU 2. Millimeter-wave radar or the like may also be used instead of the laser radar 4.

The stereo camera 5 has two imaging portions provided on a back surface of a front windshield of the host vehicle M, for example. These two imaging portions are arranged lined up in the vehicle width direction of the host vehicle M, and capture an image of the area in front of the host vehicle M. The stereo camera 5 transmits the image information for the area in front of the host vehicle M to the alert ECU 2. A monocular camera may also be used instead of the stereo camera 5.

The vehicle speed sensor 6 is a detector that detects the vehicle speed of the host vehicle M. A wheel speed sensor that is provided on a wheel of the host vehicle M or a drive shaft or the like that rotates together with the wheel, may be used as the vehicle speed sensor 6. This vehicle speed sensor 6 transmits detected vehicle speed information (wheel speed information) to the alert ECU 2.

The direction indicator detecting portion 7 is provided on a direction indicator lever of the host vehicle M, for example, and detects operation of the direction indicator by the driver. The direction indicator detecting portion 7 detects whether there is an on (illuminating) operation of a left direction indicator or an on operation of a right direction indicator by the driver. The direction indicator detecting portion 7 transmits the detected direction indicator information to the alert ECU 2.

The steering angle sensor 8 is provided on a steering shaft of the host vehicle M, for example, and detects a steering angle of a steering wheel that is connected to the steering shaft. The steering angle sensor 8 transmits steering angle information related to the steering angle to the alert ECU 2.

The navigation system 9 guides the driver of the host vehicle M to a destination set by the driver. The navigation system 9 has, for example, a GPS receiving portion 11 for measuring the position information of the host vehicle M, and a map database 12 within which map information is stored. The GPS receiving portion 11 measures the position information (such as longitude and latitude) of the host vehicle M, by receiving signals from three or more GPS satellites. The map information of the map database 12 includes, for example, road position information, road type information, and road shape information and the like.

The navigation system 9 recognizes the traveling road on which the host vehicle M is traveling, and the traveling lane in which the host vehicle M is traveling, based on the position information of the host vehicle M measured by the GPS receiving portion 11, and the map information in the map database. The navigation system 9 calculates the route from the position of the host vehicle M to the destination, and guides the driver along that route by a display on a navigation display and audio output from a speaker in the host vehicle M. The navigation system 9 transmits the position information of the host vehicle M, the information about the traveling road (traveling lane) of the host vehicle M, and information about the guide route of the host vehicle M, for example, to the alert ECU 2. The alerting apparatus 1 does not necessarily have to be provided with the navigation system 9.

The HMI 10 is an interface for inputting and outputting information between the driver and the alerting apparatus 1. The HMI 10 includes, for example, a display for outputting image information, a speaker for outputting audio information, and an operating button or a touch panel or the like for the driver to perform input operations. The HMI 10 may include a wearable device that the driver has on his or her person, and the driver may be alerted by vibration. The HMI 10 outputs information to the driver from the display or the speaker, according to a control signal from the alert ECU 2. The alerting apparatus 1 does not necessarily have to be provided with the HMI 10. At the very least, the HMI 10 need simply be configured to be able to output an image on a display or output audio from a speaker in the host vehicle M.

Next, the functional structure of the alert ECU 2 will be described. The alert ECU 2 has a traffic jurisdiction determining portion 20, a vehicle speed determining portion 21, an intersection recognizing portion 22, a moving obstacle information obtaining portion 23, a path estimating portion 24, a traveling direction determining portion 25, an intersect determination range setting portion 26, an intersect determining portion 27, and an alerting portion 28.

The traffic jurisdiction determining portion 20 determines if the host vehicle M is traveling in a left-hand traffic jurisdiction or in a right-hand traffic jurisdiction. The traffic jurisdiction determining portion 20 determines whether the host vehicle M is traveling in a left-hand traffic jurisdiction or in a right-hand traffic jurisdiction based on, for example the position information of the host vehicle M and the map information. Information regarding left-hand traffic jurisdiction or right-hand traffic jurisdiction may be in the map information. The map information is not limited to map information stored in the map database 12, and may be map information referenced by an external database by communication via the communication unit 3. The same applies below.

Also, the traffic jurisdiction determining portion 20 may recognize an oncoming vehicle traveling in the opposite direction of the traveling direction (forward) of the host vehicle M, based on the image information from the stereo camera 5, the obstacle information from the laser radar 4, or vehicle-to-vehicle communication via the communication unit 3, or the like. In this case, the traffic jurisdiction determining portion 20 is able to determine the traffic jurisdiction by determining whether the oncoming vehicle is traveling on the left or the right of the host vehicle M, based on the recognition result of the oncoming vehicle. A well-known statistical method for ensuring sufficient reliability, for example, may be used for this determination. When the determination result for the traffic jurisdiction changes, the traffic jurisdiction determining portion 20 may also request that the driver confirm this change. The alert ECU 2 does not necessarily have to include the traffic jurisdiction determining portion 20. In this case, the alert ECU 2 may recognize that the traffic jurisdiction in which the host vehicle M is traveling is a right-hand traffic jurisdiction or a left-hand traffic jurisdiction, based on a setting when the host vehicle M is shipped (i.e., a factory setting), a setting at the time of maintenance, or a setting by the driver.

The vehicle speed determining portion 21 determines whether the vehicle speed of the host vehicle M is equal to or less than a preset vehicle speed threshold value, based on the vehicle speed information from the vehicle speed sensor 6. When the alert ECU 2 includes the intersection recognizing portion 22, the alert ECU 2 does not necessarily have to include the vehicle speed determining portion 21.

The intersection recognizing portion 22 recognizes the intersection T in front of the host vehicle M, based on the position information of the host vehicle M and the map information, for example. The intersection recognizing portion 22 may also recognize the intersection T based on roadside-to-vehicle communication or vehicle-to-vehicle communication via the communication unit 3. Also, the intersection recognizing portion 22 may recognize the intersection T by image processing of the image information from the stereo camera 5. The intersection recognizing portion 22 recognizes a stop line SL on the entrance side of the intersection T (the host vehicle M side of the traveling road Ra) based on the map information when the intersection T is recognized, for example.

The intersection recognizing portion 22 determines whether a distance between the host vehicle M and the intersection T is equal to or less than a preset distance threshold value, based on the position information of the host vehicle M and the map information, for example. The intersection recognizing portion 22 may employ the distance between the host vehicle M and the stop line SL on the entrance side of the intersection T, as the distance between the host vehicle M and the intersection T. The alert ECU 2 does not necessarily have to include the intersection recognizing portion 22.

The moving obstacle information obtaining portion 23 obtains moving obstacle information. The moving obstacle information obtaining portion 23 obtains the moving obstacle information based on at least one of the obstacle information from the laser radar 4 and the image information from the stereo camera 5. The moving obstacle information includes position information of the moving obstacle. Further, the moving obstacle information obtaining portion 23 may obtain the moving obstacle information based on wireless communication (e.g., roadside-to-vehicle communication, vehicle-to-vehicle communication, or pedestrian-to-vehicle communication or the like) via the communication unit 3. The moving obstacle information may include information regarding the traveling direction or path of the moving obstacle, information regarding the speed of the moving obstacle, information regarding the type of moving obstacle (i.e., information about the type, such as a four-wheeled vehicle, a two-wheeled vehicle, a pedestrian, a bicycle or the like), and information regarding the size of the moving obstacle (including information about the width), and the like.

The moving obstacle information obtaining portion 23 determines whether there is a moving obstacle that will be an alert candidate, based on the obtained moving obstacle information. The moving obstacle information obtaining portion 23 recognizes a moving obstacle that is moving in a direction toward the host vehicle M, for example, as an alert candidate. When the intersection recognizing portion 22 recognizes an intersection T in front of the host vehicle M, the moving obstacle information obtaining portion 23 may also recognize a moving obstacle approaching this intersection T as an alert candidate. Also, the moving obstacle information obtaining portion 23 may recognize all moving obstacles for which information is obtained as alert candidates.

The path estimating portion 24 estimates the path of the moving obstacle, based on the moving obstacle information. The path estimating portion 24 estimates the path of the moving obstacle based on a change over time in the position information of the moving obstacle, presuming that the change over time in this position information will continue, for example. The path estimating portion 24 may also estimate the path of the moving obstacle based on the position information of the moving obstacle according to another known method. The path estimating portion 24 may estimate a path having the same width as the width of the moving obstacle. The path estimating portion 24 may estimate a path of the moving obstacle such that it follows a road on the map, based on the map information. Also, the path estimating portion 24 may estimate a plurality of paths for a single moving obstacle. The length of the path may be finite or infinite. In the drawings, the paths are indicated by arrows of finite lengths due to the nature of the drawings.

When information of a planned path of another vehicle is able to be obtained via vehicle-to-vehicle communication, for example, the path estimating portion 24 may estimate that path as the path of the other vehicle. Also, even if a moving obstacle such as another vehicle is stopped temporarily, for example, the path estimating portion 24 may estimate a path extending in the direction that the moving obstacle is facing (e.g., the direction in front of another vehicle or in the direction that the face of a pedestrian is facing or the like) when the orientation of the moving obstacle is able to be recognized by image processing of the image information from the stereo camera 5 or the like.

The traveling direction determining portion 25 determines the traveling direction of the host vehicle M. The traveling direction determining portion 25 determines the traveling direction of the host vehicle M that will enter the intersection T, based on the direction indicator information of the direction indicator detecting portion 7, for example. When the direction indicator on the right side of the host vehicle M is on (i.e., illuminated), the traveling direction determining portion 25 determines that the traveling direction of the host vehicle M is a right turn. When the direction indicator on the left side of the host vehicle M is on (i.e., illuminated), the traveling direction determining portion 25 determines that the traveling direction of the host vehicle M is a left turn. When the direction indicator is off (i.e., not illuminated), the traveling direction determining portion 25 determines that the traveling direction of the host vehicle M is straight ahead. Straight ahead also includes a case in which there is a curve following the road.

The traveling direction determining portion 25 determines the traveling direction of the host vehicle M when it is determined by the vehicle speed determining portion 21 that the vehicle speed of the host vehicle M is equal to or less than the vehicle speed threshold value, for example. Also, the traveling direction determining portion 25 may determine the traveling direction of the host vehicle M when it is determined by the intersection recognizing portion 22 that the distance between the host vehicle M and the intersection T is equal to or less than the distance threshold value La.

The intersect determination range setting portion 26 sets an intersect determination range in front of the host vehicle M based on the determination result of the traveling direction determining portion 25. The intersect determination range setting portion 26 sets an intersect determination range along the ground, for example. When the traveling direction of the host vehicle M is straight ahead, the intersect determination range setting portion 26 sets a straight intersect determination range A (an intersect determination range of length L1).

When the traveling direction of the host vehicle M is a left turn in a left-hand traffic jurisdiction, the intersect determination range setting portion 26 sets the intersect determination range B that is shorter in length in the front-rear direction of the host vehicle M than when the traveling direction of the host vehicle M is a right turn. More specifically, when the traveling direction of the host vehicle M is a right turn in a left-hand traffic jurisdiction, for example, the intersect determination range setting portion 26 sets the intersect determination range A for a right turn. When the traveling direction of the host vehicle M is a left turn in a left-hand traffic jurisdiction, the intersect determination range setting portion 26 sets the intersect determination range B for a left turn (i.e., an intersect determination range of length L2).

Similarly, when the traveling direction of the host vehicle M is a right turn in a right-hand traffic jurisdiction, the intersect determination range setting portion 26 sets the intersect determination range B that is shorter in length in the front-rear direction of the host vehicle M than when the traveling direction of the host vehicle M is a left turn. More specifically, when the traveling direction of the host vehicle M is a right turn in a right-hand traffic jurisdiction, for example, the intersect determination range setting portion 26 sets the intersect determination range B for a right turn. When the traveling direction of the host vehicle M is a left turn in a right-hand traffic jurisdiction, the intersect determination range setting portion 26 sets the intersect determination range A for a left turn.

When the road width H of the crossroad Rb is able to be recognized based on the map information, wireless communication, or image information from the stereo camera 5 or the like, the intersect determination range setting portion 26 may set the intersect determination range A of the length L1 that is equal to or greater than the road width H. Similarly, when the road width H of the crossroad Rb is able to be detected, the intersect determination range setting portion 26 may set an intersect determination range of the length L2 that is equal to or less than one-half of the road width H (i.e., H/2).

The intersect determining portion 27 determines whether the path of the moving obstacle estimated by the path estimating portion 24 intersects with the intersect determination range set by the intersect determination range setting portion 26. Intersection of the path of the moving obstacle and the intersect determination range refers to a state in which the path and the intersect determination range cross in a two-dimensional plane irrespective of the height direction. In the scenarios shown in FIGS. 2B, 3B, and 5B, for example, the intersect determining portion 27 determines that the path C1 of the other vehicle N1 and the path C2 of the other vehicle N2 intersect with the intersect determination range A. In the scenarios shown in FIGS. 4B and 6B, for example, the intersect determining portion 27 determines that the path C2 of the other vehicle N2 intersects with the intersect determination range B. When a moving obstacle has a path that heads directly towards the host vehicle M, the intersect determining portion 27 may set the moving obstacle as an alert target even if the intersect determination range does not intersect with that path.

The alerting portion 28 issues an alert to the driver regarding the moving obstacle that is an alert target for which the intersect determining portion 27 has determined that the intersect determination range intersects with the path. The alerting portion 28 issues the alert to the driver by at least one of image information output from the display and audio output from the speaker, by transmitting a control signal to the HMI 10, for example. The alerting portion 28 does not issue an alert to the driver regarding a moving obstacle for which the intersect determining portion 27 does not determine that the intersect determination range intersects with the path.

Figure 7:
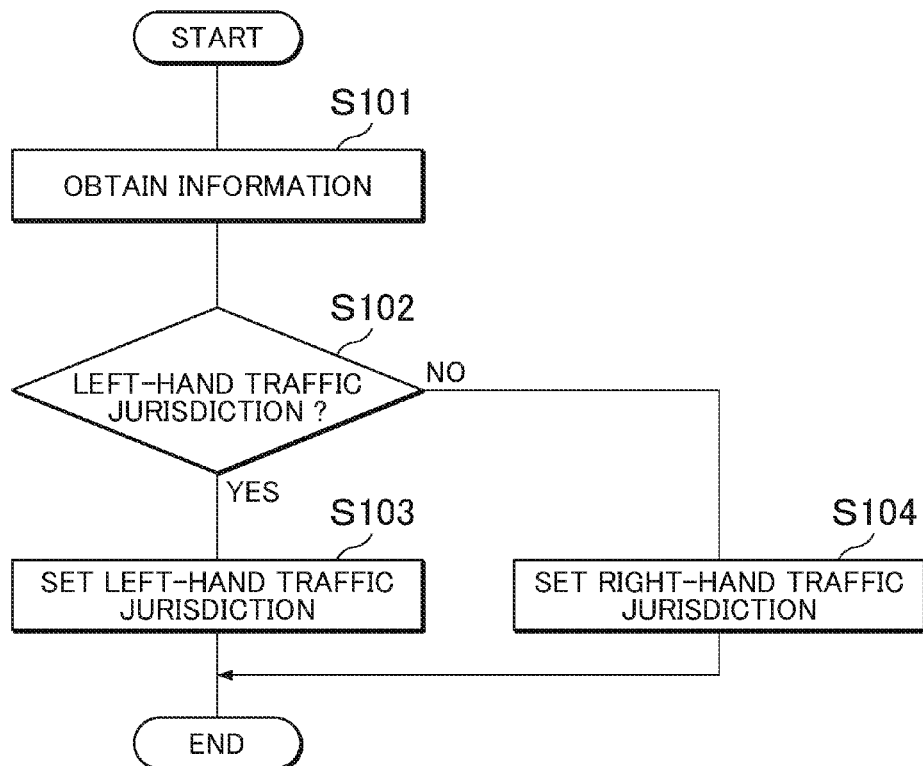
FIG. 7 is a flowchart illustrating traffic jurisdiction determining control in the alerting apparatus according to the first example embodiment.

Here, traffic jurisdiction determination control of the alerting apparatus 1 according to the first example embodiment will be described. FIG. 7 is a flowchart illustrating the traffic jurisdiction determining control in the alerting apparatus according to the first example embodiment. This traffic jurisdiction determination control is performed each time the host vehicle M travels a preset distance (e.g., 10 km), of example.

As shown in FIG. 7, with the alert ECU 2 of the alerting apparatus 1, in step S1, information for the traffic jurisdiction determination is obtained in the traffic jurisdiction determining portion 20. The traffic jurisdiction determining portion 20 obtains information (information related to the traffic jurisdiction) for the traffic jurisdiction determination based on the position information of the host vehicle M and the map information (map information that includes information regarding left- and right-hand traffic jurisdictions). The traffic jurisdiction determining portion 20 may obtain information for the traffic jurisdiction determination by wireless communication via the communication unit 3. Also, the traffic jurisdiction determining portion 20 may recognize an oncoming vehicle based on the obstacle information from the laser radar 4, and obtain information for the traffic jurisdiction determination through well-known statistical processing.

In step S102, the traffic jurisdiction determining portion 20 determines whether the host vehicle M is traveling in a left-hand traffic jurisdiction based on the obtained information. If it is determined that the host vehicle M is traveling in a left-hand traffic jurisdiction, the traffic jurisdiction determining portion 20 sets the traffic jurisdiction of the host vehicle M to the left-hand traffic jurisdiction (S103). If it is determined that the host vehicle M is not traveling in a left-hand traffic jurisdiction (i.e., the vehicle is traveling in a right-hand traffic jurisdiction), the traffic jurisdiction determining portion 20 sets the traffic jurisdiction of the host vehicle M to the right-hand traffic jurisdiction (S104). The alerting apparatus 1 does not necessarily have to perform this traffic jurisdiction determination control.

Figure 8:
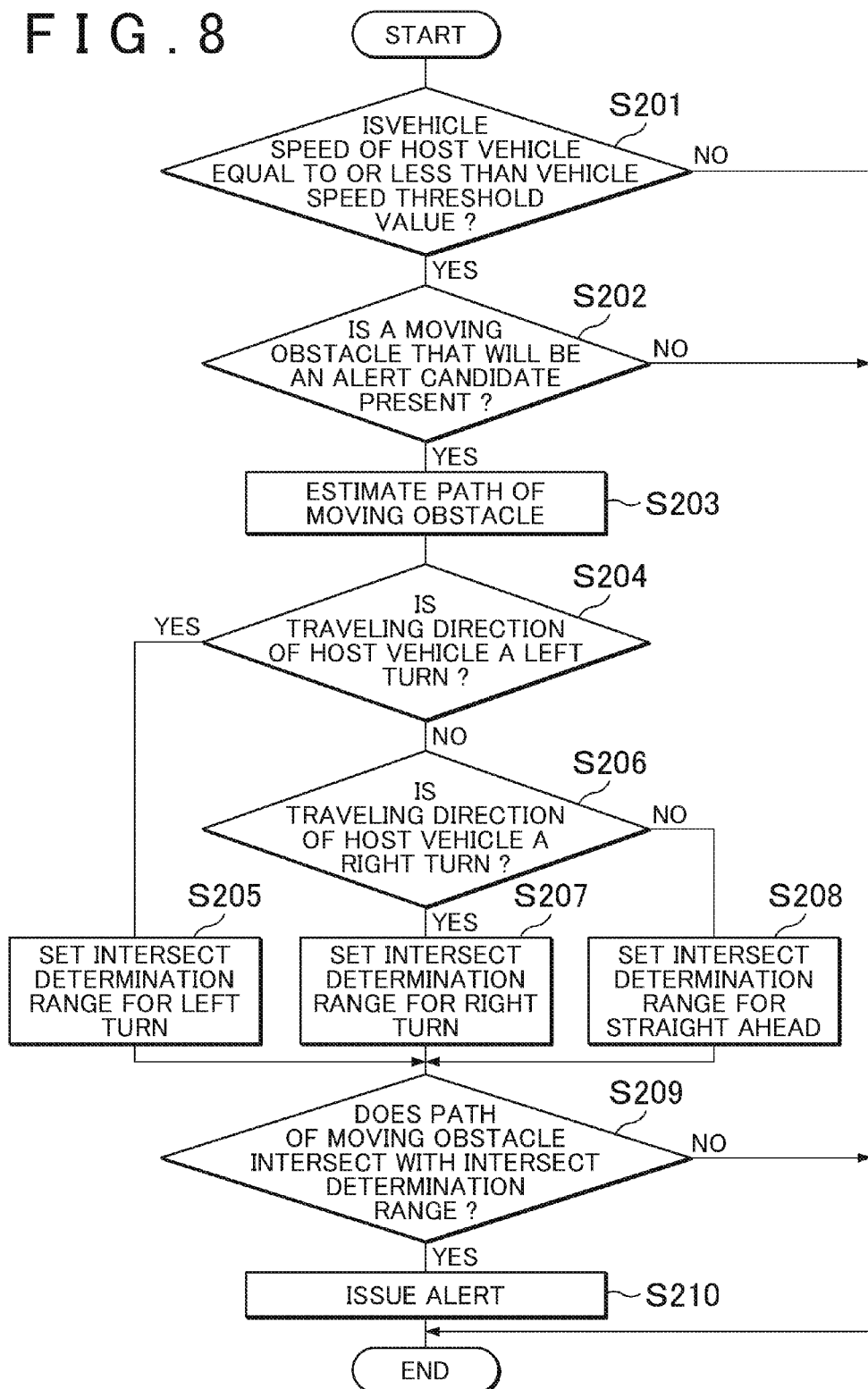
FIG. 8 is a flowchart illustrating alert control in the alerting apparatus according to the first example embodiment.

Next, the method of alert control of the alerting apparatus 1 according to the first example embodiment will be described. FIG. 8 is a flowchart illustrating alert control in the alerting apparatus according to the first example embodiment. Here, in this description, the traffic jurisdiction where the host vehicle M is traveling is a left-hand traffic jurisdiction. This alert control is repeatedly executed at preset intervals of time (such as every 0.1 seconds, for example), in the host vehicle M while the host vehicle M is traveling, for example.

In step S201, the alert ECU 2 of the alerting apparatus 1 determines, with the vehicle speed determining portion 21, whether the vehicle speed of the host vehicle M is equal to or less than a preset vehicle speed threshold value. The vehicle speed determining portion 21 determines whether the vehicle speed of the host vehicle M is equal to or less than a preset vehicle speed threshold value based on the vehicle speed information from the vehicle speed sensor 6. If it is determined that the vehicle speed of the host vehicle M is not equal to or less than the vehicle speed threshold value, the alert ECU 2 ends this cycle of the alert control. Then, after a preset period of time has passed, the alert ECU 2 repeats step S201 again. If, on the other hand, the alert ECU 2 determines that the vehicle speed of the host vehicle M is equal to or less than the vehicle speed threshold value, the process proceeds on to step S202.

In step S201, the alert ECU 2 determines, with the intersection recognizing portion 22, whether the distance between the host vehicle M and the intersection T is equal to or less than a preset distance threshold value. The intersection recognizing portion 22 recognizes the intersection T in front of the host vehicle M based on the position information of the host vehicle M and the map information, and determines whether the distance between the host vehicle M and the intersection T is equal to or less than the preset distance threshold value. In this case, it is not absolutely necessary to determine the vehicle speed of the host vehicle M with the vehicle speed determining portion 21 described above. If it is determined that the distance between the host vehicle M and the intersection T is not equal to or less than the distance threshold value, the alert ECU 2 ends this cycle of the alert control. If, on the other hand, it is determined that the distance between the host vehicle M and the intersection T is equal to or less than the distance threshold value, the alert ECU 2 proceeds on to step S202.

In step S202, the alert ECU 2 determines, with the moving obstacle information obtaining portion 23, whether a moving obstacle that will be an alert candidate is present. The moving obstacle information obtaining portion 23 obtains the moving obstacle information based on at least one of the obstacle information from the laser radar 4 and the image information from the stereo camera 5, for example. The moving obstacle information obtaining portion 23 then determines whether a moving obstacle that will be an alert candidate (e.g., a moving obstacle that is approaching the host vehicle M) is present, based on the obtained moving obstacle information.

If it is determined that a moving obstacle that will be an alert candidate is not present, the alert ECU 2 ends this cycle of the alert control and repeats the routine again from step S201. If, on the other hand, it is determined that a moving obstacle that will be an alert candidate is present, the alert ECU 2 proceeds on to step S203.

The alert ECU 2 does not necessarily have to make the determination in step S202. If the determination in step S202 is not made, then the paths of all moving obstacles for which information is able to be obtained are estimated in the next step S203.

In step S203, the alert ECU 2 estimates, with the path estimating portion 24, the path of the moving obstacle that is an alert candidate. The path estimating portion 24 estimates the path of the moving obstacle based on a change over time in the position information of the moving obstacle, for example.

In step S204, the alert ECU 2 determines, with the traveling direction determining portion 25, whether the traveling direction of the host vehicle M is a left turn. The traveling direction determining portion 25 determines the traveling direction of the host vehicle M based on the direction indicator information from the direction indicator detecting portion 7, for example. If it is determined that the traveling direction of the host vehicle M is a left turn, the alert ECU 2 proceeds on to step S205. If, on the other hand, it is determined that the traveling direction of the host vehicle M is not a left turn, the alert ECU 2 proceeds on to step S206.

In step S205, the alert ECU 2 sets, with the intersect determination range setting portion 26, the intersect determination range B for a left turn (an intersect determination range of length L2) in front of the host vehicle M. The intersect determination range setting portion 26 sets the intersect determination range B having the length L2 of a preset fixed value, for example. When the road width H of the crossroad Rb is able to be obtained based on the map information, for example, the intersect determination range setting portion 26 may also set the intersect determination range B of length L2 that is equal to one-half of the road width H (i.e., H/2). Then, the alert ECU 2 proceeds on to step S209.

In step S206, the alert ECU 2 determines, with the traveling direction determining portion 25, whether the traveling direction of the host vehicle M is a right turn. If it is determined that the traveling direction of the host vehicle M is a right turn, the alert ECU 2 proceeds on to step S207. If it is determined that the traveling direction of the host vehicle M is not a right turn, the alert ECU 2 proceeds on to step S208.

In step S207, the alert ECU 2 sets, with the intersect determination range setting portion 26, the intersect determination range A for a right turn (i.e., an intersect determination range of length L1) in front of the host vehicle M. The intersect determination range setting portion 26 sets the intersect determination range A having the length L1 that is a preset fixed value, for example. The length L1 of the intersect determination range A is longer than the length L2 of the intersect determination range B. If the road width H of the crossroad Rb is able to be obtained based on the map information, the alert ECU 2 may also set the intersect determination range A of the length L1 that is equal to the road width H. Then, the alert ECU 2 proceeds on to step S209.

In step S208, the alert ECU 2 sets, with the intersect determination range setting portion 26, the intersect determination range A for straight ahead in front of the host vehicle M. The intersect determination range A for straight ahead is the same as the intersect determination range A for a right turn. The intersect determination range A for straight ahead may also differ in shape and length from the intersect determination range A for a right turn. Then, the alert ECU 2 proceeds on to step S209.

In step S209, the alert ECU 2 determines, with the intersect determining portion 27, whether the path of the moving obstacle intersects with the intersect determination range. The alert ECU 2 may also repeatedly make the determination in step S209 until it is determined that the vehicle speed of the host vehicle M is equal to or less than the vehicle speed threshold value. Alternatively, the alert ECU 2 may make the determination in step S209 until it is determined that the host vehicle M has passed through the intersection T, based on the position information of the host vehicle M and the map information. If it is determined that the path of the moving obstacle does not intersect with the intersect determination range, the alert ECU 2 ends this cycle of the alert control and repeats the routine again from step S201. If, on the other hand, it is determined that the path of the moving obstacle intersects with the intersect determination range, the alert ECU 2 proceeds on to step S210. If it is determined that the path of at least one moving obstacle intersects with the intersect determination range, the alert ECU 2 proceeds on to step S210.

In step S210, the alert ECU 2 issues an alert to the driver with the alerting portion 28, with the moving obstacle having a path determined to intersect with the intersect determination range as a moving obstacle that is an alert target. The alerting portion 28 issues the alert to the driver by at least one of image information output from the display and audio output from the speaker, by transmitting a control signal to the HMI 10, for example.

Then, the alert ECU 2 ends this cycle of the alert control, and, after a preset period of time has passed, repeats the routine again from step S201. The alert ECU 2 may also store the moving obstacle for which an alert has been issued, and not repeat an alert for the same moving obstacle.

Further, when the alert ECU 2 has assumed that the host vehicle M will enter the intersection T and issued an alert when it is determined that the vehicle speed of the host vehicle M is equal to or less than the vehicle speed threshold value without recognizing the intersection T using the position information of the host vehicle M and the map information, the alert ECU 2 may assume that the host vehicle M has passed through the intersection T when the vehicle speed of the host vehicle M then exceeds a preset upper limit vehicle speed threshold value, and end the alert control.

Above, the alert control in a left-hand traffic jurisdiction has been described, but in a right-hand traffic jurisdiction, the intersect determination range A of the length L1 is set for a left turn in step S205, and the intersect determination range B of the length L2 is set for a right turn in step S208.

With the alerting apparatus 1 according to the first example embodiment described above, the intersect determination range B is set shorter in length in the front-rear direction when the host vehicle M that is traveling in a left-hand traffic jurisdiction turns left at the intersection T, than when the host vehicle M turns right at the intersection T. Accordingly, with this alerting apparatus 1, when the host vehicle M will turn left into the near lane Rb2 of the two-lane crossroad Rb, for example, it is possible to reduce the likelihood of the path of the moving obstacle traveling in the far lane Rb1 of the crossroad Rb (e.g., the path C1 of the other vehicle N1) intersecting with the intersect determination range B and, consequently, an alert being issued for this moving obstacle for which the host vehicle M is unlikely to come into contact with, compared to when the length of the intersect determination range is not shortened. Thus, with this alerting apparatus 1, it is possible to inhibit annoyance to the driver by an alert at the intersection T.

Also, in this alerting apparatus 1, when the host vehicle M will turn left into the near lane Rb2 of the two-lane crossroad Rb in a left-hand traffic jurisdiction, it is possible to avoid the path of a moving obstacle traveling in the far lane Rb1 of the crossroad Rb from intersecting with the intersect determination range B, and thus more appropriately inhibit annoyance to the driver by an alert at the intersection T, by setting the intersect determination range B of which the length L2 in the front-rear direction is equal to or less than one-half of the road width H of the crossroad Rb.

Similarly, according to this alerting apparatus 1, the intersect determination range B is set shorter in length in the front-rear direction when the host vehicle M traveling in a right-hand traffic jurisdiction turns right at the intersection T, than when the host vehicle M turns left at the intersection T. Therefore, with this alerting apparatus 1, when the host vehicle M will turn right into the near lane Rb2 of the two-lane crossroad Rb, for example, it is possible to reduce the likelihood of the path of the moving obstacle traveling in the far lane Rb1 of the crossroad Rb (e.g., the other vehicle N1) intersecting with the intersect determination range B and, consequently, an alert being issued for this moving obstacle for which the host vehicle M is unlikely to come into contact with, compared to when the length of the intersect determination range is not shortened. Thus, with this alerting apparatus 1, it is possible to inhibit annoyance to the driver by an alert at the intersection T.

Similarly, in this alerting apparatus 1, when the host vehicle M will turn right into the near lane Rb2 of the two-lane crossroad Rb in a right-hand traffic jurisdiction, it is possible to avoid the path of a moving obstacle traveling in the far lane Rb1 of the crossroad Rb from intersecting with the intersect determination range B, and thus more appropriately inhibit annoyance to the driver by an alert at the intersection T, by setting the intersect determination range B of which the length L2 in the front-rear direction is equal to or less than one-half of the road width H of the crossroad Rb. The alerting apparatus 1 may be configured to support only one type of jurisdiction, i.e., either a left-hand traffic jurisdiction or a right-hand traffic jurisdiction.

Figure 9:
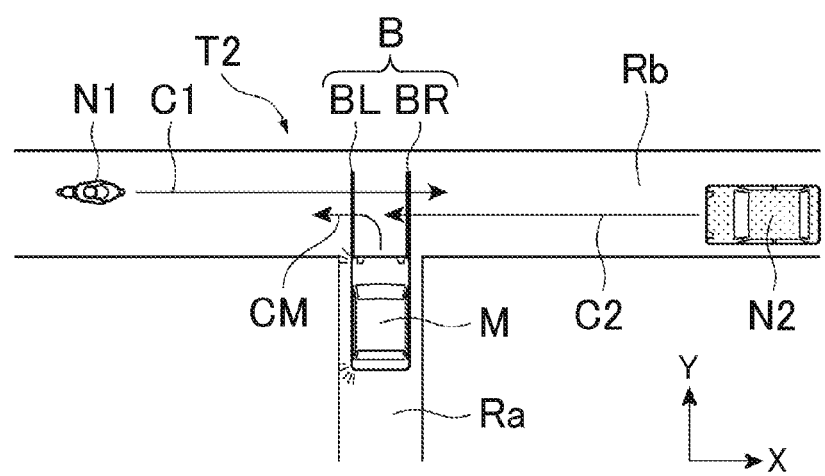
FIG. 9 is a plan view showing the relationship between an intersect determination range of the host vehicle and the path of another vehicle, when the traveling direction at an intersection (a T-intersection) of the host vehicle that is traveling in a left-hand traffic jurisdiction is a left turn.

Continuing on, the operation and effects of the alerting apparatus 1 will now be described with reference to the drawings. FIG. 9 is a plan view showing the relationship between an intersect determination range of the host vehicle M and the path of another vehicle, when the traveling direction at an intersection (a T-intersection) T2 of the host vehicle M that is traveling in a left-hand traffic jurisdiction is a left turn. The intersection T2 shown in FIG. 9 differs from the intersection T shown in FIG. 2 in that it is a T-intersection, and that the crossroad Rb is a narrow road. This crossroad Rb is a narrow road with a narrow road width and is not divided into lanes, so it is difficult for four-wheeled vehicles to pass each other. The other vehicle N1 shown in FIG. 9 is a two-wheeled vehicle.

In the scenario shown in FIG. 9, the traveling direction of the host vehicle M is a left turn, so the alerting apparatus 1 sets the intersect determination range B of a length L2 that is shorter than when the traveling direction of the host vehicle M is a right turn. Here, the alerting apparatus 1 does not reference map information or the like, and thus does not recognize the road width of the crossroad Rb. In this case, the alerting apparatus 1 sets the intersect determination range B of the short length L2, but because the crossroad Rb is a narrow road, the paths C1 and C2 of the other vehicles N1 and N2 traveling on the crossroad Rb intersect with the intersect determination range B. When the crossroad Rb is a narrow road and there is a possibility of contact between the other vehicle N1 and the host vehicle M in this way, the other vehicle N1 traveling on the far side when viewed from the host vehicle M is not omitted as an alert target, so the driver can be appropriately alerted, with both of the other vehicles N1 and N2 being alert targets.

Even if the alerting apparatus 1 does recognize the road width H of the crossroad Rb based on map information, the alerting apparatus 1 does not have to set the length L2 shorter than equal to or less than one-half of the road width H of the crossroad Rb that is a narrow road. The alerting apparatus 1 may set the length L2 so that it will not be equal to or less than a minimum value (e.g., 1.5 meters) for which the length L2 is set to avoid contact between the host vehicle M and the other vehicle.

Figure 10A:
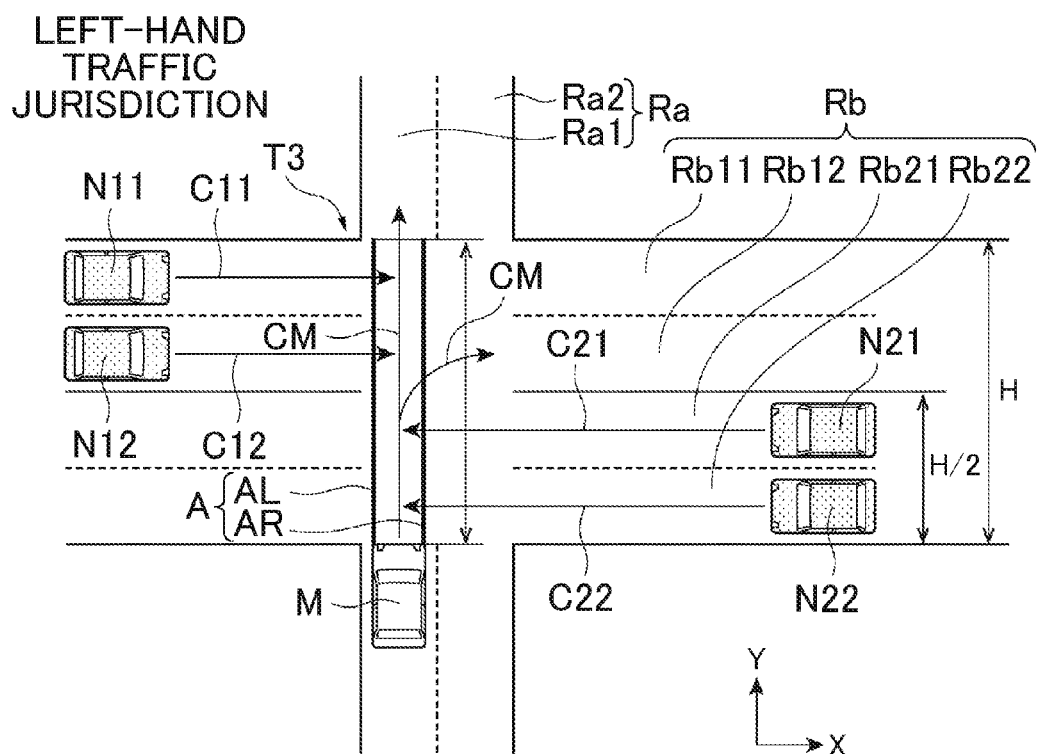
FIG. 10A is a plan view showing the relationship between an intersect determination range of the host vehicle and the paths of other vehicles, when the traveling direction at an intersection of the host vehicle that is traveling in a left-hand traffic jurisdiction is straight ahead or a right turn.

FIG. 10A is a plan view showing the relationship between an intersect determination range of the host vehicle M and the paths of other vehicles, when the traveling direction at an intersection T3 of the host vehicle M that is traveling in a left-hand traffic jurisdiction is straight ahead or a right turn. The intersection T3 shown in FIG. 10A differs from the intersection T shown in FIG. 2A in that the traveling road Ra is a two-lane road (i.e., one lane on each side), and the crossroad Rb is a four-lane road (i.e., two lanes on each side).

In FIG. 10A, the crossroad Rb has a first far lane Rb11, a second far lane Rb12, a first near lane Rb21, and a second near lane Rb22. The first far lane Rb11 is the farthest lane from the host vehicle M. The second far lane Rb12 is one lane closer than the first far lane Rb11. The first near lane Rb21 is one lane closer than the second far lane Rb12, and the center line of the crossroad Rb is sandwiched between this first near lane Rb21 and the second far lane Rb12. The second near lane Rb22 is the nearest lane to the host vehicle M. Another vehicle N11 is another vehicle that is traveling from the left side to the right side of the host vehicle M, in the first far lane Rb11. Another vehicle N12 is another vehicle that is traveling from the left side to the right side of the host vehicle M, in the second far lane Rb12. Another vehicle N21 is another vehicle that is traveling from the right side to the left side of the host vehicle M, in the first near lane Rb21. Another vehicle N22 is another vehicle that is traveling from the right side to the left side of the host vehicle M, in the second near lane Rb22.

In the scenario shown in FIG. 10A, the traveling direction of the host vehicle M is straight ahead or a right turn, so the alerting apparatus 1 sets the intersect determination range A of the length L1. Here, the alerting apparatus 1 recognizes the crossroads intersection T3 with the intersection recognizing portion 22, and recognizes the road width H of the crossroad Rb of the intersection T3. In this case, the alerting apparatus 1 sets the intersect determination range A of the length L1 that is equal to the road width H of the crossroad Rb, for example. As a result, the alerting apparatus 1 recognizes all of the other vehicles N11, N12, N21, and N22 having paths C11, C12, C21, and C22 that intersect with the intersect determination range A as alert targets, and is able to alert the driver.

The alerting apparatus 1 does not necessarily have to recognize the road width H of the crossroad Rb, and the length L1 does not have to be equal to or greater than the road width H of the crossroad Rb. The Length L1 may be one-half of the road width H of the crossroad Rb from the position of the host vehicle M shown in FIG. 10A. In this case, the host vehicle M will move forward to go straight or turn right, so the intersect determination range A will reach all the way to the first far lane Rb11 and the second far lane Rb12. As a result, the other vehicles N11 and N12 are also able to be appropriately set as alert targets. In this case, the length L2 of the intersect determination range B when the host vehicle M will turn left is shorter than the length of one-half of the road width H.

Figure 10B:
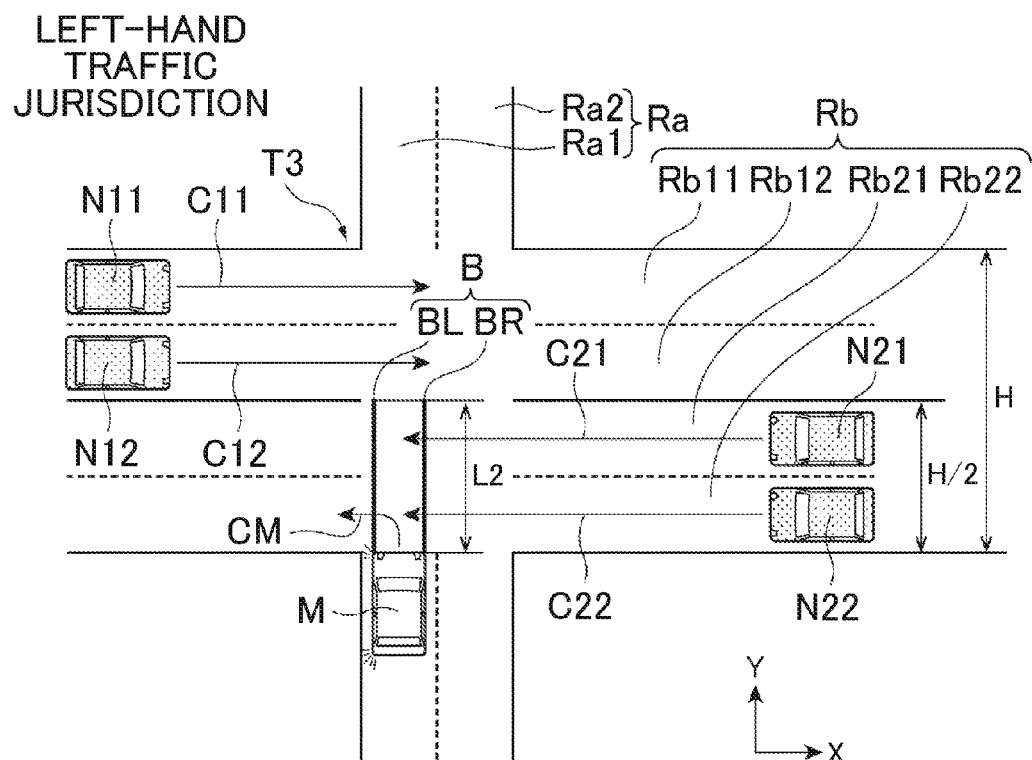
FIG. 10B is a plan view showing the relationship between the intersect determination range of the host vehicle and the paths of other vehicles, when the traveling direction of the host vehicle that is traveling in a left-hand traffic jurisdiction is a left turn.

FIG. 10B is a plan view showing the relationship between the intersect determination range of the host vehicle M and the paths of other vehicles N, when the traveling direction of the host vehicle M that is traveling in a left-hand traffic jurisdiction is a left turn. In the scenario shown in FIG. 10B, the traveling direction of the host vehicle M is a left turn, so the alerting apparatus 1 sets the intersect determination range B of the length L2. The alerting apparatus 1 may also recognize the road width H of the crossroad Rb, and set the length L2 to one-half of the road width H, for example.

If the length L2 is shorter than the length L1, the length L2 may be set longer than one-half of the road width H. Even if the length L2 were to reach all the way to the second far lane Rb12, it is possible to avoid the path C11 of the other vehicle N11 traveling in the first far lane Rb11 from intersecting with the intersect determination range B. As a result, it is possible to avoid the other vehicle N11 that is unlikely to contact the host vehicle M from becoming an alert target, and thus inhibit annoyance to the driver.

Also, even if the length L2 were to reach all the way to a portion of the first far lane Rb11, when the length L2 is shorter than the road width H of the length L2 in the intersection, it is possible to reduce the likelihood that a two-wheeled vehicle or a bicycle traveling on a shoulder of the first far lane Rb11 will become an alert target. Moreover, even if both the length L1 and the length L2 are longer than the road width H and extend beyond the intersection T3, when the traveling direction of the host vehicle M is a left turn, it is possible to reduce the likelihood that a pedestrian or a bicycle that is attempting to cross the traveling road Ra farther beyond the intersection T3 will become an alert target, and thereby possible to inhibit annoyance to the driver, by setting the intersect determination range B of the length L2 that is shorter than the length L1.

Next, a modified example of the alerting apparatus 1 according to the first example embodiment will be described. The alerting apparatus 1 according to the modified example differs from the alerting apparatus 1 according to the first example embodiment in that the intersect determination range A bends and deforms (i.e., curves) according to the steering angle of the host vehicle M.

Figure 11A:
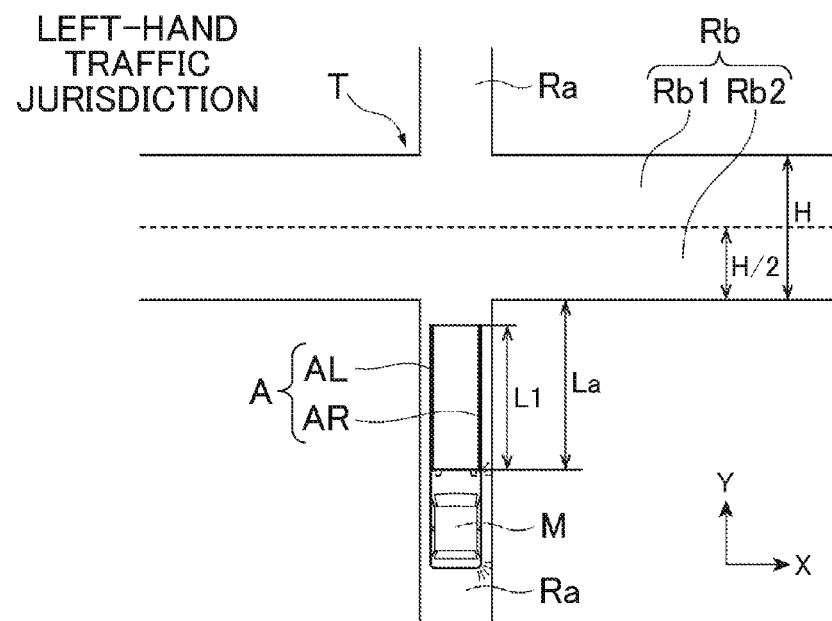
FIG. 11A is a plan view of the setting of the intersect determination range when the traveling direction at the intersection of the host vehicle traveling in a left-hand traffic jurisdiction is a right turn, in an alerting apparatus according to a modified example of the first example embodiment.

Here, FIG. 11A is a plan view of the setting of the intersect determination range when the traveling direction at the intersection T of the host vehicle M traveling in a left-hand traffic jurisdiction is a right turn. The scenario shown in FIG. 11A is similar to the scenario shown in FIG. 2A, so a detailed description thereof will be omitted. In the scenario shown in FIG. 11A, the traveling direction of the host vehicle M is a right turn, so the alerting apparatus 1 according to the modified example sets the intersect determination range A of the length L1. In the scenario shown in FIG. 11A, the host vehicle M is traveling straight (i.e., the steering angle is substantially zero), so the intersect determination range A remains a linear shape without bending and deforming.

Figure 11B:
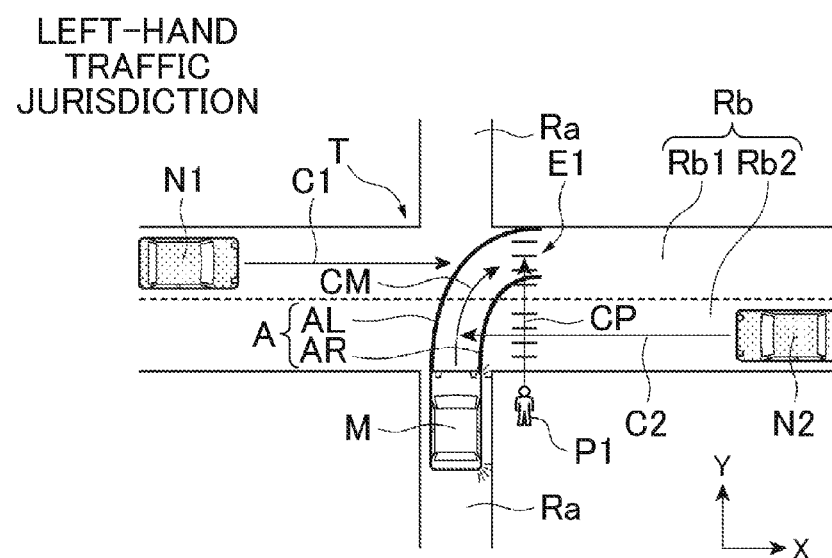
FIG. 11B is a plan view showing the relationship between the intersect determination range when the host vehicle will turn right at the intersection in a left-hand traffic jurisdiction, and the paths of other vehicles.

FIG. 11B is a plan view showing the relationship between the intersect determination range when the host vehicle M will turn right at the intersection T in a left-hand traffic jurisdiction, and the paths of other vehicles. As shown in FIG. 11B, when the steering angle to the right increases due to steering by the driver of the host vehicle M, the alerting apparatus 1 according to the modified example sets the intersect determination range A that curves to the right farther away from the host vehicle M. The alerting apparatus 1 according to the modified example bends and deforms the intersect determination range A based on the steering angle of the host vehicle M, for example. At this time, the overall length of the intersect determination range A increases due to the bending deformation, but the length L1 of the intersect determination range A in the front-rear direction of the host vehicle M remains the same. By having the alerting apparatus 1 bend and deform the intersect determination range A to the right according to the steering angle of the host vehicle M, for example, a path CP of a pedestrian P1 crossing at a crosswalk E1 on the right side of the intersection T intersects with the intersect determination range A, so the alerting apparatus 1 is able to recognize the pedestrian P1 as an alert target.

Figure 12A:
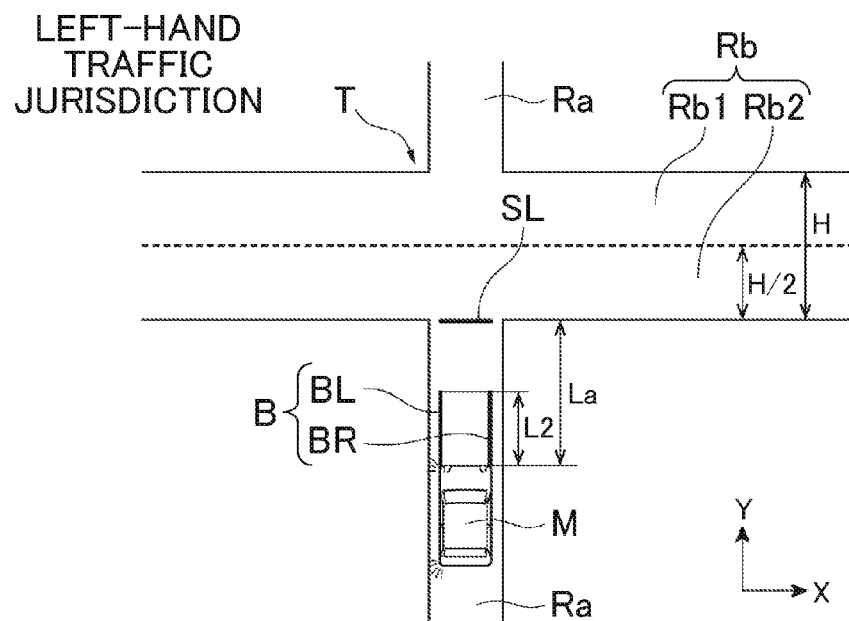
FIG. 12A is a plan view of the setting of the intersect determination range when the traveling direction at an intersection of the host vehicle traveling in a left-hand traffic jurisdiction is a left turn, in the alerting apparatus according to the modified example of the first example embodiment.

FIG. 12A is a plan view of the setting of the intersect determination range when the traveling direction at an intersection of the host vehicle traveling in a left-hand traffic jurisdiction is a left turn. The scenario shown in FIG. 12A is similar to the scenario shown in FIG. 4A, so a detailed description thereof will be omitted. In the scenario shown in FIG. 12A, the traveling direction of the host vehicle M will be a left turn, so the alerting apparatus 1 according to the modified example sets the intersect determination range B of the length L2. Also, in the scenario shown in FIG. 12A, the host vehicle M is traveling straight ahead, so the intersect determination range B remains a linear shape without bending and deforming.

Figure 12B:
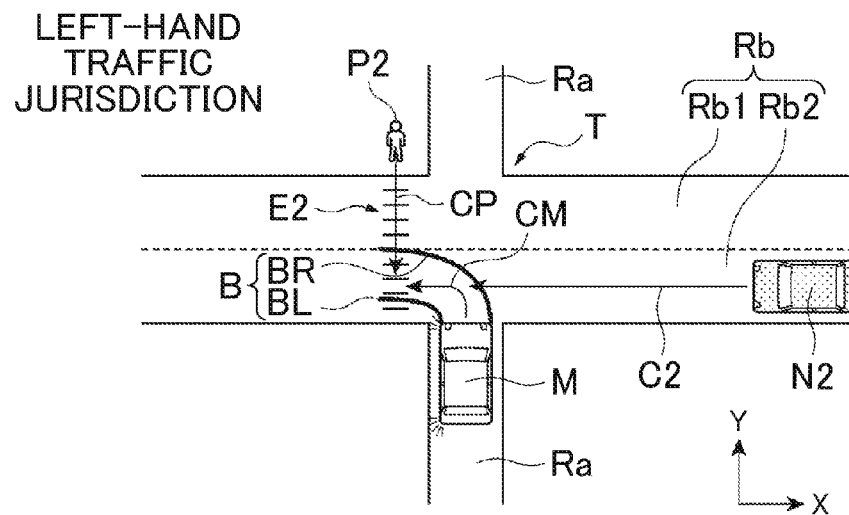
FIG. 12B is a plan view showing the relationship between the intersect determination range when the host vehicle will turn left at the intersection in a left-hand traffic jurisdiction, and the path of another vehicle.

FIG. 12B is a plan view showing the relationship between the intersect determination range when the host vehicle will turn left at the intersection in a left-hand traffic jurisdiction, and the path of another vehicle. As shown in FIG. 12B, when the steering angle to the left increases due to steering by the driver of the host vehicle M, the alerting apparatus 1 according to the modified example sets the intersect determination range B that curves to the left farther away from the host vehicle M. At this time, the overall length of the intersect determination range B increases due to the bending deformation, but the length L2 of the intersect determination range B in the front-rear direction of the host vehicle M remains the same. That is, even if the intersect determination range B bends and deforms, the length L2 in the front-rear direction of the host vehicle M is still shorter than the length L1. By having the alerting apparatus 1 bend and deform the intersect determination range B to the left according to the steering angle of the host vehicle M, for example, the path CP of a pedestrian P2 crossing at a crosswalk E2 on the right side of the intersection T intersects with the intersect determination range B, so the alerting apparatus 1 is able to recognize the pedestrian P2 as an alert target.

Figure 13:
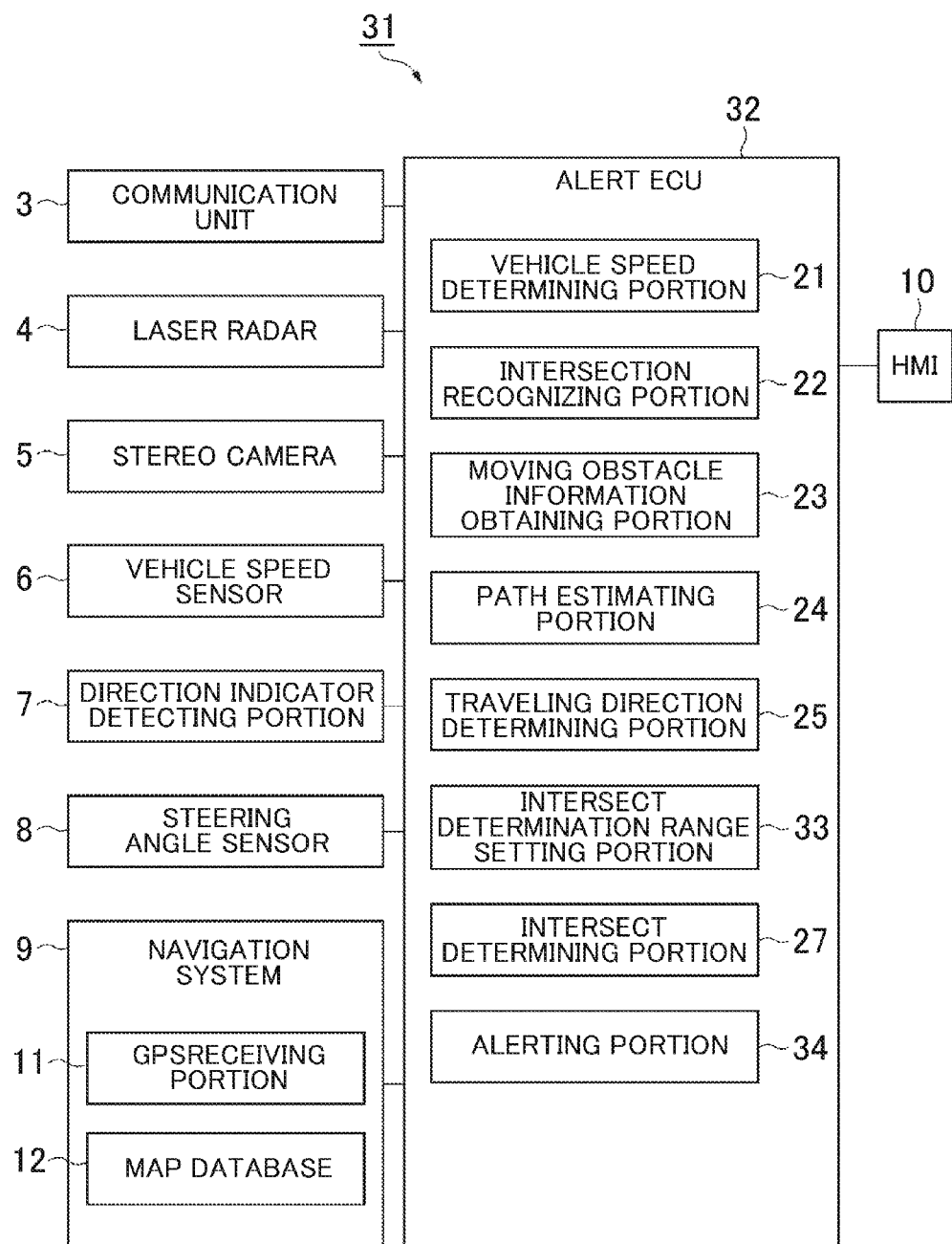
FIG. 13 is a block diagram of an alerting apparatus according to a second example embodiment of the invention.

FIG. 13 is a block diagram block diagram of an alerting apparatus 31 according to a second example embodiment of the invention. The alerting apparatus 31 according to the second example embodiment shown in FIG. 13 differs from the alerting apparatus 1 according to the first example embodiment in that the length of the intersect determination range does not change based on the traveling direction of the host vehicle M, and the timing of the alert changes.

Figure 14A:
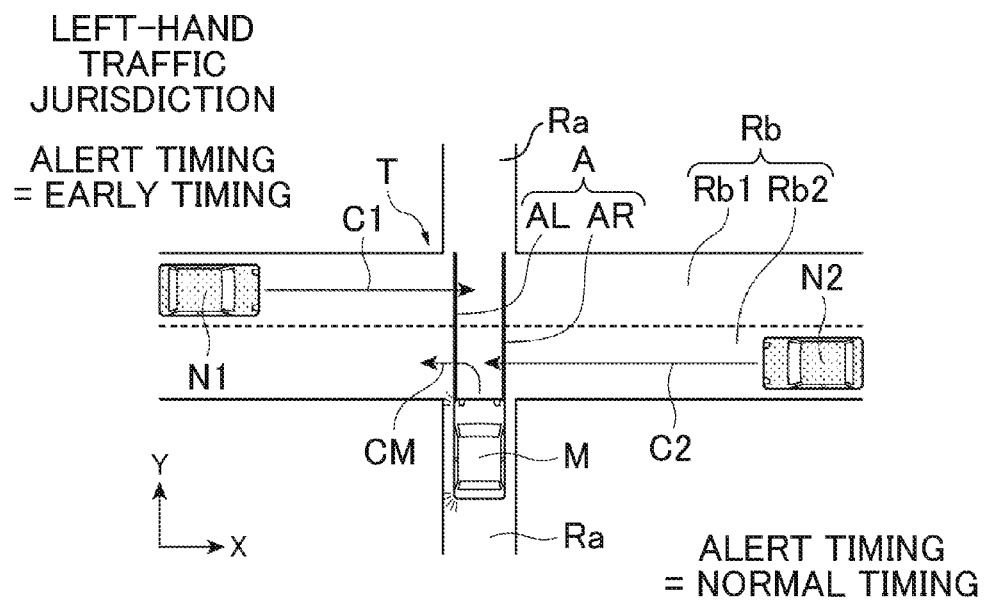
FIG. 14A is a plan view showing the timings of alerts of other vehicles, when the traveling direction at the intersection of the host vehicle traveling in a left-hand traffic jurisdiction is a left turn.

Here, FIG. 14A is a plan view showing the timings of alerts of other vehicles, when the traveling direction at the intersection T of the host vehicle M traveling in a left-hand traffic jurisdiction is a left turn. As shown in FIG. 14A, even if the traveling direction at the intersection T of the host vehicle M that is traveling in a left-hand traffic jurisdiction is a left turn, the alerting apparatus 31 sets the intersect determination range A of a fixed length L1 in front of the host vehicle M. In the scenario shown in FIG. 14A, the alerting apparatus 31 determines that both the path C1 of the other vehicle N1 and the path C2 of the other vehicle N2 intersect with the intersect determination range A, and therefore sets both the vehicle N1 and the vehicle N2 as alert targets.

When the traveling direction at the intersection T of the host vehicle M that is traveling in a left-hand traffic jurisdiction is a left turn, the alerting apparatus 31 sets the timing of the alert related to the other vehicle N1 that is positioned on the left side of the host vehicle M earlier than that for the other vehicle N2 that is positioned on the right side of the host vehicle M. The other vehicle N2 that is positioned on the left side of the host vehicle M is another vehicle that will be facing the host vehicle M after the host vehicle M turns left. On the other hand, the other vehicle N1 that is positioned on the right side of the host vehicle M is another vehicle that will be traveling away from the host vehicle M in the opposite direction after the host vehicle M turns left.

The timing of the alert is set based on a TTC (Time To Collision) between the host vehicle M and the other vehicles N1 and N2 in the vehicle width direction (i.e., the X axis direction) of the host vehicle M, for example. That is, the alerting apparatus 31 sets the TTC that issues an alert for the other vehicle N1 positioned on the left side of the host vehicle M as a larger value than it does for the other vehicle N2 positioned on the right side of the host vehicle M. The alerting apparatus 31 sets the timing of the alert related to the other vehicle N2 positioned on the right side of the host vehicle M to a normal timing, and sets the timing of the alert related to the other vehicle N1 positioned on the left side of the host vehicle M to an early timing. The normal timing is an alert timing preset as a reference. The early timing is a timer earlier than the normal timing. The early timing may be a timing in which a preset value (such as 1 second) is added to the value of the TTC of the normal timing.

A THW (Time Headway; a vehicle-to-vehicle time) between the host vehicle M and the other vehicles N1 and N2 may be employed instead of the TTC. Also, setting the alert timing to an early timing refers to setting the timing of an alert regarding the other vehicle N1 positioned on the left side of the host vehicle M earlier than the timing of an alert regarding the other vehicle N2 positioned on the right side of the host vehicle M, when the other vehicle N1 and the other vehicle N2 are approaching the host vehicle M at the same speed and from the same distance. Setting the alert timing to an early timing does not necessarily mean that the alert of the other vehicle N1 positioned on the left side of the host vehicle M will be issued to the driver temporally earlier than the alert of the other vehicle N2 positioned on the right side of the host vehicle M, irrespective of the speed toward the host vehicle M and distance to the host vehicle M.

Figure 14B:
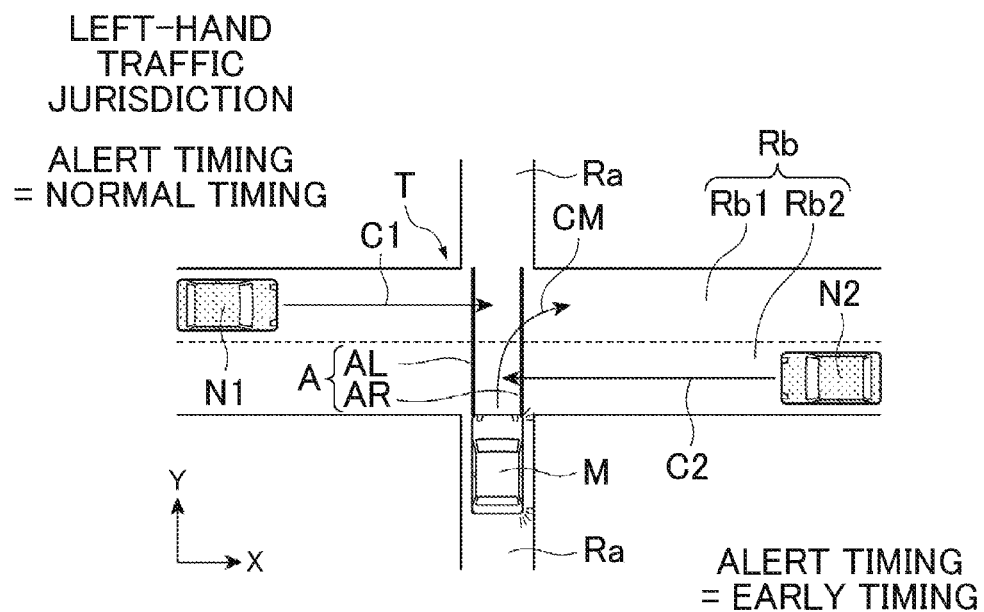
FIG. 14B is a plan view showing the timings of alerts of other vehicles, when the traveling direction at the intersection of the host vehicle traveling in a left-hand traffic jurisdiction is a right turn.

FIG. 14B is a plan view showing the timings of alerts regarding other vehicles, when the traveling direction at the intersection T of the host vehicle M traveling in a left-hand traffic jurisdiction is a right turn. As shown in FIG. 14B, when the traveling direction at the intersection T of the host vehicle M that is traveling in a left-hand traffic jurisdiction is a right turn, the timing of an alert regarding the other vehicle N2 positioned on the right side of the host vehicle M is set to an earlier timing than that of an alert regarding the other vehicle N1 positioned on the left side of the host vehicle M. The other vehicle N1 positioned on the right side of the host vehicle M is another vehicle that will be facing the host vehicle M after the host vehicle M turns right. On the other hand, the other vehicle N2 positioned on the left side of the host vehicle M is another vehicle that will be traveling away from the host vehicle M in the opposite direction after the host vehicle M turns right. The alerting apparatus 31 sets the timing of the alert of the other vehicle N1 to the normal timing, and sets the timing of the alert of the other vehicle N2 to the early timing.

FIG. 14C is a plan view showing the timings of alerts of other vehicles, when the traveling direction at the intersection T of the host vehicle M traveling in a left-hand traffic jurisdiction is straight ahead. As shown in FIG. 14C, when the traveling direction at the intersection T of the host vehicle M is straight ahead, the alerting apparatus 31 sets the timing of an alert of the other vehicle N1 positioned on the left side of the host vehicle M and the timing of an alert of the other vehicle N2 positioned on the right side of the host vehicle M the same. The alerting apparatus 31 sets the timings of the alerts of the other vehicles N1 and N2 to the normal timing.

Figure 15A:
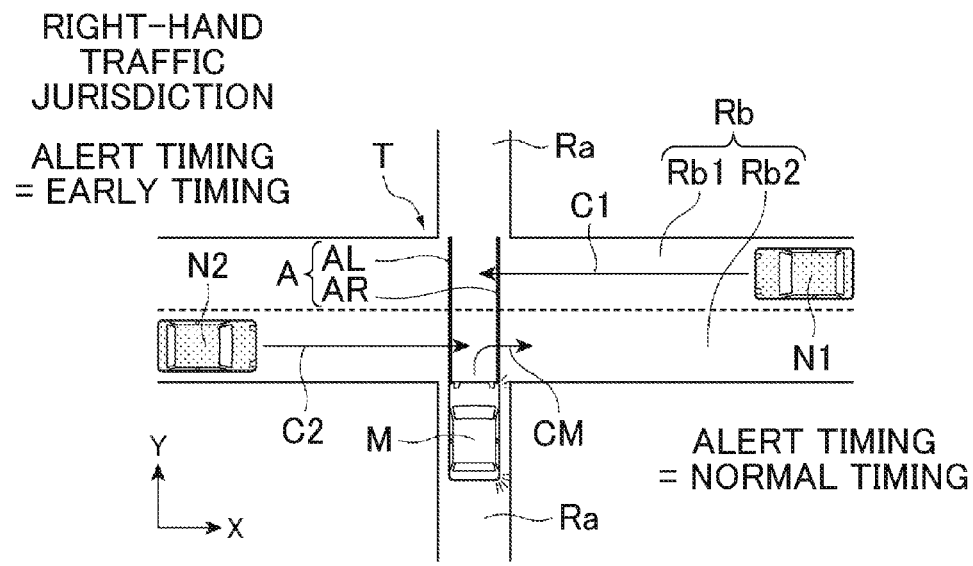
FIG. 15A is a plan view showing the timings of alerts of other vehicles, when the traveling direction at the intersection of the host vehicle traveling in a right-hand traffic jurisdiction is a right turn.

Continuing on, FIG. 15A is a plan view showing the timings of alerts of other vehicles, when the traveling direction at the intersection T of the host vehicle M traveling in a right-hand traffic jurisdiction is a right turn. As shown in FIG. 15A, when the traveling direction at the intersection T of the host vehicle M traveling in a right-hand traffic jurisdiction is a right turn, the alerting apparatus 31 sets the timing of an alert regarding the other vehicle N1 positioned on the right side of the host vehicle M to an earlier timing than that of an alert regarding the other vehicle N2 positioned on the left side of the host vehicle M. The alerting apparatus 31 sets the timing of the alert of the other vehicle N1 to the early timing, and sets the timing of the alert of the other vehicle N2 to the normal timing, for example.

Figure 15B:
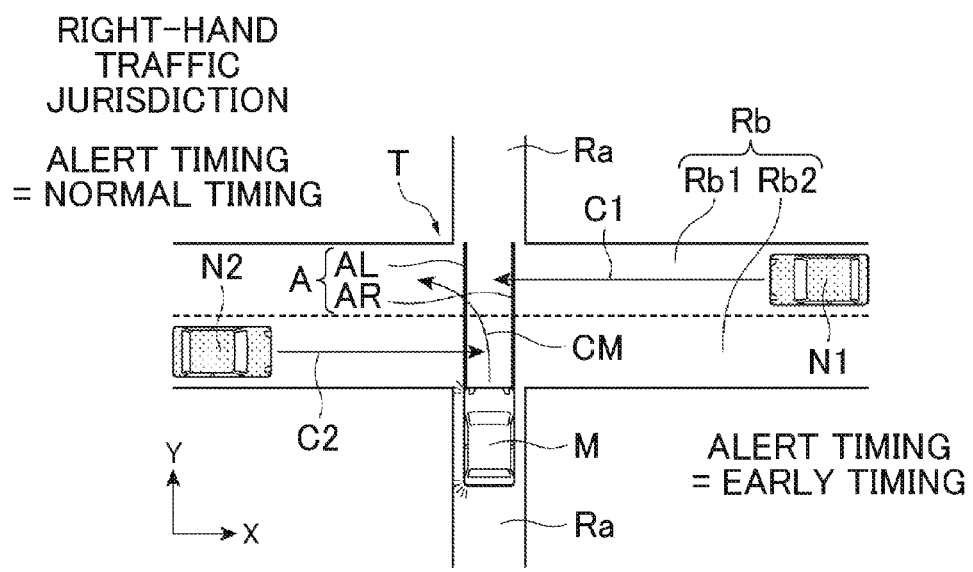
FIG. 15B is a plan view showing the timings of alerts of other vehicles, when the traveling direction at the intersection of the host vehicle traveling in a right-hand traffic jurisdiction is a left turn.

FIG. 15B is a plan view showing the timings of alerts of other vehicles, when the traveling direction at the intersection T of the host vehicle M traveling in a right-hand traffic jurisdiction is a left turn. As shown in FIG. 15B, when the traveling direction at the intersection T of the host vehicle M traveling in a right-hand traffic jurisdiction is a left turn, the alerting apparatus 31 sets the timing of an alert regarding the other vehicle N2 positioned on the left side of the host vehicle M to an earlier timing than that of an alert regarding the other vehicle N1 positioned on the right side of the host vehicle M. The alerting apparatus 31 sets the timing of the alert of the other vehicle N2 to the early timing, and sets the timing of the alert of the other vehicle N1 to the normal timing, for example.

FIG. 15C is a plan view showing the timings of alerts of other vehicles, when the traveling direction at the intersection T of the host vehicle M traveling in a right-hand traffic jurisdiction is straight ahead. As shown in FIG. 15C, when the traveling direction of the host vehicle M at the intersection T is straight ahead, the alerting apparatus 31 sets the timing of the alert of the other vehicle N1 positioned on the right side of the host vehicle M and the timing of the alert of the other vehicle N2 positioned on the left side of the host vehicle M the same. The alerting apparatus 31 sets the timings of the alerts of the vehicles N1 and N2 to the normal timing, for example. Above, a case in which the moving obstacle is another vehicle is described, but the moving obstacle does not have to be another vehicle. That is, the moving obstacle may also be a pedestrian or a bicycle or the like. Also, another vehicle does not necessarily have to be present on both the left and right sides of the host vehicle M.

As shown in FIG. 13, the alerting apparatus 31 according to the second example embodiment differs from the alerting apparatus 1 according to the first example embodiment with respect to the functions of an intersect determination range setting portion 33 and an alerting portion 34 in an alert ECU 32. Structure that overlaps with the first example embodiment will be denoted by like reference characters and descriptions of that structure will be omitted.

The intersect determination range setting portion 33 sets only the intersect determination range A of a fixed length L1, regardless of the determination result regarding the traveling direction of the host vehicle M according to the traveling direction determining portion 25. When it is determined by the vehicle speed determining portion 21 that the vehicle speed of the host vehicle M is equal to or less than a preset vehicle speed threshold value, and it is determined by the moving obstacle information obtaining portion 23 that a moving obstacle that will be an alert candidate is present, for example, the intersect determination range setting portion 33 sets the intersect determination range A that extends out in front of the host vehicle M. Alternatively, the intersect determination range setting portion 33 may also set the intersect determination range A when it is determined, based on the position information of the host vehicle M and map data, that a distance between the host vehicle M and an intersection T in front of the host vehicle M that has been recognized by the intersection recognizing portion 22 is equal to or less than a preset distance threshold value, and it is determined by the moving obstacle information obtaining portion 23 that a moving obstacle that will be an alert candidate is present. The intersect determination range setting portion 33 may also set intersect determination ranges A or intersect determination ranges B of different lengths, based on the traveling direction of the host vehicle M. This will be described in detail later.

The alerting portion 34 sets the timing of an alert for a moving obstacle that is an alert target having a path that intersects with the intersect determination range A in the intersect determining portion 27, based on the position of this moving obstacle, and the traveling direction of the host vehicle M. When the traveling direction of the host vehicle M is a left turn, the alerting portion 34 sets the timing of an alert regarding a moving obstacle positioned on the left side of the host vehicle M to an earlier timing than that of an alert regarding a moving obstacle positioned on the right side of the host vehicle M. That is, when the traveling direction of the host vehicle M is a left turn, the alerting portion 34 sets the timing of an alert regarding a moving obstacle positioned on the left side of the host vehicle M to an early timing, for example. In contrast, the alerting portion 34 sets the timing of an alert regarding a moving obstacle positioned on the right side of the host vehicle M to the normal timing, for example, when the traveling direction of the host vehicle M is a left turn.

Also, the alerting portion 34 sets the timing of an alert regarding a moving obstacle positioned on the right side of the host vehicle M to the earlier timing than that of an alert regarding a moving obstacle positioned on the left side of the host vehicle M. That is, when the traveling direction of the host vehicle M is a right turn, the alerting portion 34 sets the timing of an alert regarding a moving obstacle positioned on the right side of the host vehicle M to an early timing, for example. In contrast, the alerting portion 34 sets the timing of an alert regarding a moving obstacle positioned on the left side of the host vehicle M to the normal timing, for example, when the traveling direction of the host vehicle M is a right turn.

When the traveling direction of the host vehicle M is straight ahead, the alerting portion 34 sets the timings of the alerts regarding both moving obstacles to the same timing, for example. When the traveling direction of the host vehicle M is straight ahead, the alerting portion 34 sets all of the timings of the alerts regarding moving obstacles that are alert targets to the normal timing, for example. When the moving obstacle is positioned on the left or the right of the host vehicle M, it means that the moving obstacle is positioned on the left or the right of a center axis that extends in the front-rear direction of the host vehicle M, for example. When the moving obstacle is positioned directly in front of the host vehicle M, the alerting portion 34 sets the timing of the alert to the normal timing, for example.

Figure 16A:
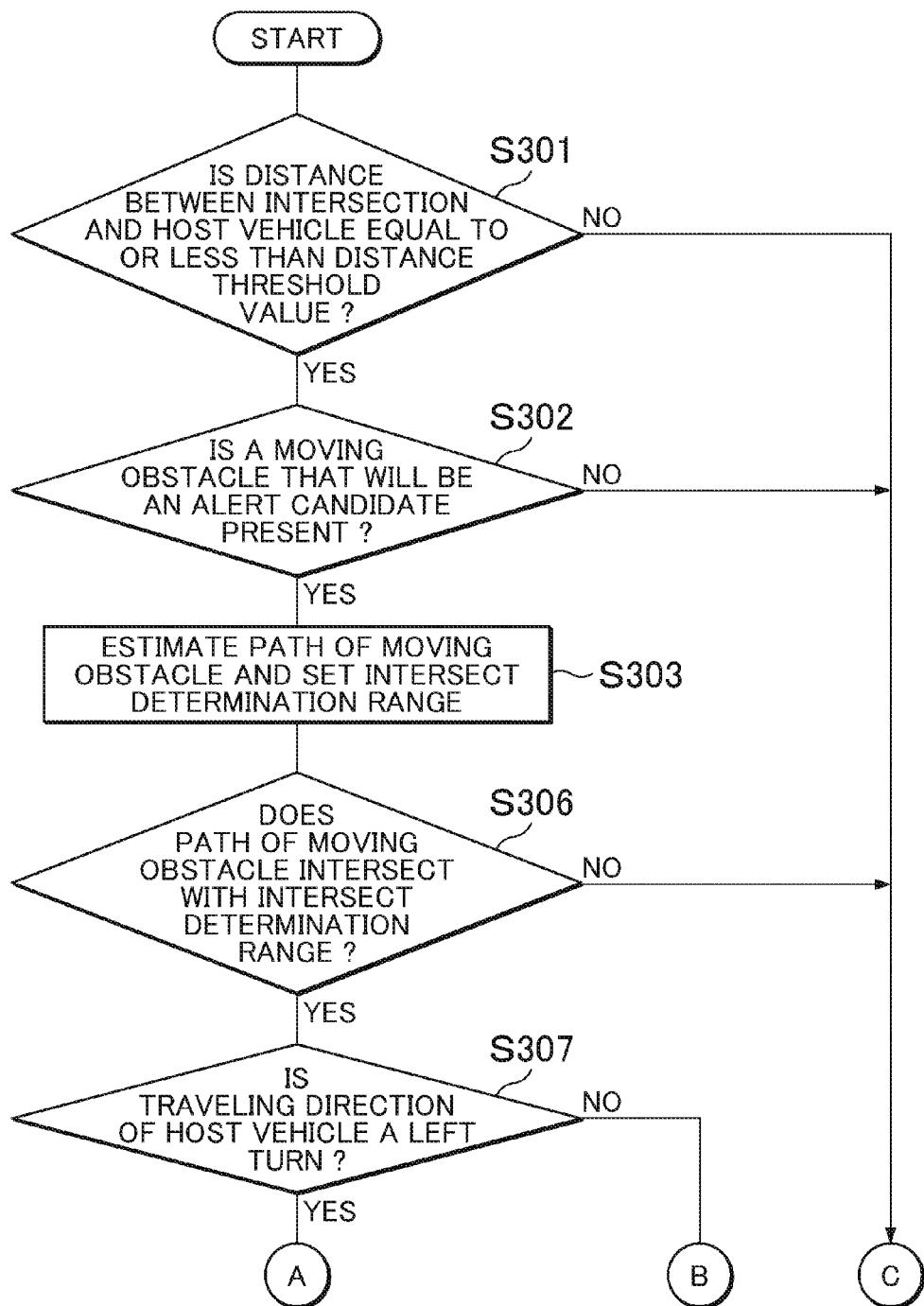
FIG. 16A is a flowchart illustrating alert control in the alerting apparatus according to the second example embodiment.

Continuing on, a method of alert control of the alerting apparatus according to the second example embodiment will now be described. FIGS. 16A and B are flowchart illustrating alert control in the alerting apparatus 31 according to the second example embodiment. This alert control is repeatedly executed at preset intervals of time (such as every 0.1 seconds, for example) while the host vehicle M is traveling, for example. This alert control may be applied in both left- and right-hand traffic jurisdictions.

As shown in FIGS. 16A and B, in step S301, the alert ECU 32 of the alerting apparatus 31 according to the second example embodiment determines, with the intersection recognizing portion 22, whether a distance between the intersection T and the host vehicle M is equal to or less than a preset distance threshold value. The intersection recognizing portion 22 determines whether the distance between the intersection T and the host vehicle M is equal to or less than the distance threshold value, based on position information of the host vehicle M from the GPS receiving portion 11 and map information from the map database 12.

If the distance between the intersection T and the host vehicle M is not equal to or less than the distance threshold value, then the alert ECU 32 ends this cycle of the alert control. The alert ECU 32 will also determine that the distance between the intersection T and the host vehicle M is not equal to or less than the distance threshold value when the intersection recognizing portion 22 is unable to recognize an intersection in front of the host vehicle M. If, on the other hand, it is determined that the distance between the intersection T and the host vehicle M is equal to or less than the distance threshold value, the alert ECU 32 proceeds on to step S302. Step S201 in the first example embodiment may also be used instead of step S301 described above.

In step S302, the moving obstacle information obtaining portion 23 of the alert ECU 32 determines whether a moving obstacle that will be an alert candidate is present. In step S302, the same process as that in step S202 in the first example embodiment is performed. If it is determined that a moving obstacle that will be an alert candidate is not present, the alert ECU 32 ends this cycle of the alert control and repeats the routine again from step S301. If, on the other hand, it is determined that a moving obstacle that will be an alert candidate is present, the alert ECU 32 proceeds on to step S303. The alert ECU 32 does not necessarily have to make the determination in step S302. If the determination in step S302 is not made, the paths of all moving obstacles for which information is able to be obtained are estimated in the next step S303.

In step S303, the alert ECU 32 estimates, with the path estimating portion 24, the path of a moving obstacle that is an alert candidate, and sets the intersect determination range A in front of the host vehicle M with the intersect determination range setting portion 33. The step of estimating the path of the moving obstacle is similar to step S203 in the first example embodiment, for example. However, the intersect determination range setting portion 33 sets the intersect determination range A of a fixed length L1, regardless of the traveling direction of the host vehicle M, which is different differs from the first example embodiment. After estimating the path of the moving obstacle and setting the intersect determination range A, the alert ECU 32 proceeds on to step S306.

In step S306, the alert ECU 32 determines, with the intersect determining portion 27, whether the path of the moving obstacle intersects with the intersect determination range A. In this step S306, a process similar to that in step S209 in the first example embodiment is performed, for example. If it is determined that the path of the moving obstacle does not intersect with the intersect determination range A, the alert ECU 32 ends this cycle of the alert control and repeats the process again from step S301. If, on the other hand, it is determined that the path of the moving obstacle intersects with the intersect determination range A, the alert ECU 32 recognizes the moving obstacle as an alert target and proceeds on to step S307.

In step S307, the alert ECU 32 determines, with the traveling direction determining portion 25, whether the traveling direction of the host vehicle M is a left turn. In this step S307, a process similar to that in step S204 in the first example embodiment is performed, for example. If it is determined that the traveling direction of the host vehicle M is a left turn, the alert ECU 32 proceeds on to step S308. If, on the other hand, it is determined that the traveling direction of the host vehicle M is not a left turn, the alert ECU 32 proceeds on to step S311.

In step S308, the alert ECU 32 determines whether the moving obstacle that is an alert target is positioned on the left side of the host vehicle M. The alert ECU 32 determines whether the moving obstacle that is an alert target is positioned on the left side of the host vehicle M, based on the position information of the moving obstacle obtained by the moving obstacle information obtaining portion 23. The determination of the position of the moving obstacle that is an alert target may also be made by the moving obstacle information obtaining portion 23. If it is determined that the moving obstacle that is an alert target is positioned on the left side of the host vehicle M, the alert ECU 32 proceeds on to step S310. If, on the other hand, it is determined that the moving obstacle that is an alert target is not positioned on the left side of the host vehicle M, the alert ECU 32 proceeds on to step S309.

In step S310 sets the timing of the alert regarding the moving obstacle determined to be positioned on the left side of the host vehicle M to the early timing with the alerting portion 34. Then, the alert ECU 32 proceeds on to step S315.

In step S309, the alert ECU 32 sets the timing of the alert regarding the moving obstacle determined not to be positioned on the left side of the host vehicle M to the normal timing with the alerting portion 34. Then, the alert ECU 32 proceeds on to step S315.

In step S311, the alert ECU 32 determines, with the traveling direction determining portion 25, whether the traveling direction of the host vehicle M is a right turn. In this step S311, a similar process as that in step S206 in the first example embodiment is performed, for example. If it is determined that the traveling direction of the host vehicle M is a right turn, the alert ECU 32 proceeds on to step S312. If, on the other hand, it is determined that the traveling direction of the host vehicle M is not a right turn, the alert ECU 32 proceeds on to step S314. At this time, the alert ECU 32 may also recognize that the traveling direction of the host vehicle M is straight ahead.

In step S312, the alert ECU 32 determines whether the moving obstacle that is an alert target is positioned on the right side of the host vehicle M. If it is determined that the moving obstacle that is an alert target is positioned on the right side of the host vehicle M, the alert ECU 32 proceeds on to step S313. If, on the other hand, it is determined that the moving obstacle that is an alert target is not positioned on the right side of the host vehicle M, the alert ECU 32 proceeds on to step S314.

In step S313, the alert ECU 32 sets the timing of the alert regarding the moving obstacle determined to be positioned on the right side of the host vehicle M to the early timing with the alerting portion 34. Then, the alert ECU 32 proceeds on to step S315.

In step S314, the alert ECU 32 sets the timing of the alert regarding the moving obstacle to the normal timing with the alerting portion 34. That is, when the traveling direction of the host vehicle M is straight ahead, the alerting portion 34 sets the timing of the alert regarding the moving obstacle to the normal timing, regardless of the position of the moving obstacle. Also, when the traveling direction of the host vehicle M is a right turn, the alert ECU 32 sets the timing of the alert regarding the moving obstacle determined not to be positioned on the right side of the host vehicle M to the normal timing. Then, the alert ECU 32 proceeds on to step S315.

In step S315, the alert ECU 32 issues an alert to the driver regarding the moving obstacle that is an alert target with the alerting portion 34. When it is determined that the moving obstacle has reached the set timing of the alert based on the moving obstacle information obtained by the moving obstacle information obtaining portion 23, for example, the alert regarding the moving obstacle is issued. Then, the alert ECU 32 ends this cycle of the alert control, and, after a preset period of time has passed, repeats the process again from step S301. The alert ECU 32 may also store the moving obstacle for which an alert has been issued, and not repeat an alert for the same moving obstacle.

With the alerting apparatus 31 according to the second example embodiment described above, when the host vehicle M turns left at the intersection T, it is more difficult for the driver to notice a moving obstacle positioned on the left side of the host vehicle M (e.g., a moving obstacle that will be traveling in the opposite direction from the host vehicle after the host vehicle turns left), than a moving obstacle positioned on the right side of the host vehicle M (e.g., a moving obstacle that will be traveling in the same direction as the host vehicle M after the host vehicle M turns left). Therefore, when a moving obstacle for which there should be an alert is positioned on the left side of the host vehicle M, the timing of the alert is set to an earlier timing than when the moving obstacle is positioned on the right side of the host vehicle M. Similarly, with this alerting apparatus 31, when the host vehicle M will turn right at the intersection T, the timing of an alert is set to an earlier timing when a moving obstacle for which there should be an alert is positioned on the right side of the host vehicle M than when the moving obstacle is positioned on the left side of the host vehicle M. Therefore, with this alerting apparatus 31, the driver of the host vehicle M that will turn left or right can be made aware early on of a moving obstacle positioned in a direction where the driver may not easily notice it. Hence, this alerting apparatus 31 is able to reduce the likelihood of contact between the host vehicle M and a moving obstacle such as another vehicle.

While various example embodiments of the invention have described, the invention is not limited to these example embodiments. The invention may be carried out in a variety of modes that have been modified or improved in any of a variety of ways based on the knowledge of one skilled in the art. The structure of the first example embodiment described above and the structure of the second example embodiment described above may also be suitably combined.

Hereinafter, a mode in which the intersect determination range is set based on the traveling direction of the host vehicle M, as in the first example embodiment, in the alerting apparatus 31 according to the second example embodiment will be described with reference to the drawings. Here, a case in which the host vehicle M is traveling in a left-hand traffic jurisdiction will be described.

Figure 17A:
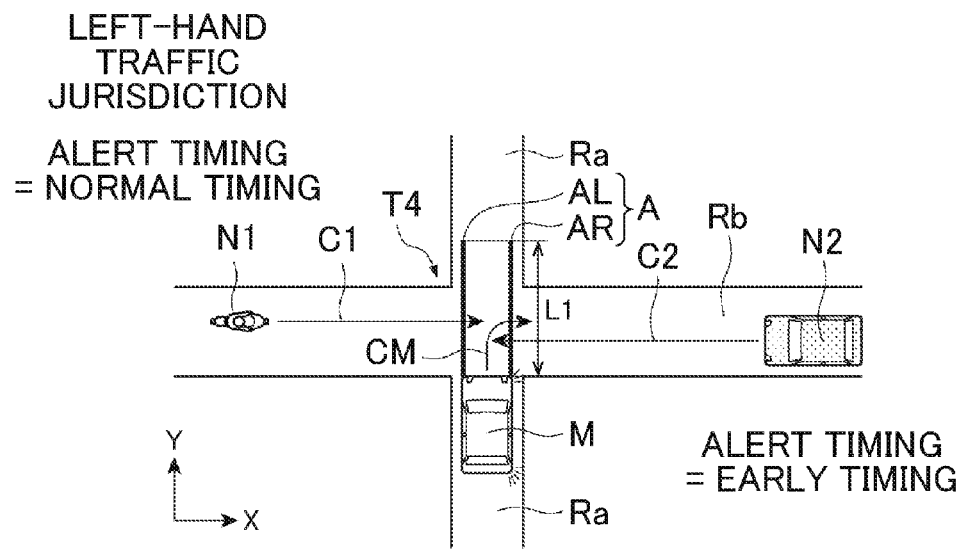
FIG. 17A is a plan view showing the timings of alerts of other vehicles, when the traveling direction at the intersection of the host vehicle traveling in a left-hand traffic jurisdiction is a right turn, in the alerting apparatus according to a modified example of the second example embodiment.

FIG. 17A is a plan view showing the timings of alerts of other vehicles, when the traveling direction at an intersection T4 of the host vehicle M traveling in a left-hand traffic jurisdiction is a right turn, in the alerting apparatus 31 according to the modified example of the second example embodiment. The intersection T4 shown in FIG. 17A is a crossroads intersection in which the traveling road Ra crosses the crossroad Rb in a cross shape. The crossroad Rb is a narrow road with a narrow road width and is not divided into lanes, so it is difficult for four-wheeled vehicles to pass each other. Also, the other vehicle N1 in FIG. 17A is a two-wheeled vehicle.

As shown in FIG. 17A, when the traveling direction of the host vehicle M that is traveling in a left-hand traffic jurisdiction, the alerting apparatus 31 according to the modified example sets the intersect determination range A of the length L1. In the scenario shown in FIG. 17A, both the path C1 of the other vehicle N1 and the path C2 of the other vehicle N2 intersect with the intersect determination range A, so both the other vehicle N1 and the other vehicle N2 are alert targets.

In this case, when the traveling direction at the intersection T4 of the host vehicle M is a left turn, the alerting apparatus 31 sets the timing of the alert regarding the other vehicle N2 positioned on the right side of the host vehicle M to an earlier timing than that of an alert regarding the other vehicle N1 positioned on the left side of the host vehicle M. The alerting apparatus 31 according to the modified example sets the timing of the alert regarding the other vehicle N2 that is positioned on the right side of the host vehicle M to the early timing, and sets the timing of the alert regarding the other vehicle N1 that is positioned on the left side of the host vehicle M to the normal timing, for example.

Figure 17B:
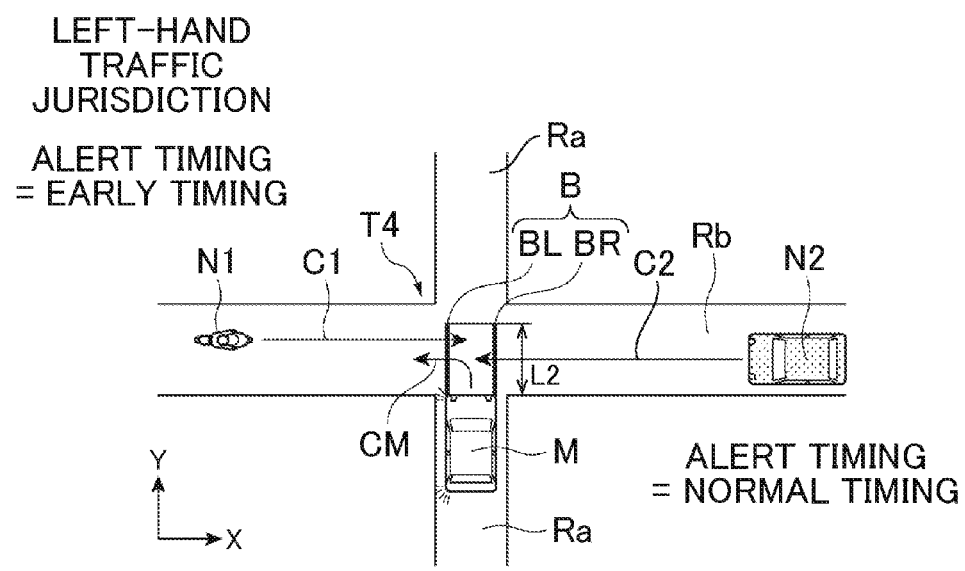
FIG. 17B is a plan view showing the timings of alerts of other vehicles when the traveling direction at the intersection of the host vehicle traveling in a left-hand traffic jurisdiction is a left turn, in the alerting apparatus according to the modified example of the second example embodiment.

FIG. 17B is a plan view showing the timings of alerts of other vehicles when the traveling direction at the intersection T4 of the host vehicle M traveling in a left-hand traffic jurisdiction is a left turn, in the alerting apparatus 31 according to the modified example of the second example embodiment. As shown in FIG. 17B, when the traveling direction of the host vehicle M that is traveling in a left-hand traffic jurisdiction is a left turn, the alerting apparatus 31 according to this modified example sets the intersect determination range B of the length L2. In the scenario shown in FIG. 17B, the crossroad Rb is a narrow road, so both the path C1 of the other vehicle N1 and the path C2 of the other vehicle N2 intersect with the intersect determination range B of the short length L2, and thus both the other vehicle N1 and the other vehicle N2 are set as alert targets.

In this case, when the traveling direction at the intersection T4 of the host vehicle M is a right turn, the alerting apparatus 31 according to this modified example sets the timing of an alert regarding the other vehicle N1 positioned on the left side of the host vehicle M to an earlier timing than that of an alert regarding the other vehicle N2 positioned on the right side of the host vehicle M. The alerting apparatus 31 according to the modified example sets the timing of the alert regarding the other vehicle N2 positioned on the right side of the host vehicle M to the normal timing, and sets the timing of the alert regarding the other vehicle N1 positioned on the left side of the host vehicle M to the early timing, for example.

Also, when the traveling direction of the host vehicle M that is traveling in a left-hand traffic jurisdiction is a left turn, as shown in FIGS. 4A and 4B, the alerting apparatus 31 according to the modified example sets the intersect determination range B having a shorter length in the front-rear direction (i.e., the Y axis direction) than for a right turn. As a result, it is possible to avoid the other vehicle N1 with which contact is unlikely being set as an alert target, thereby inhibiting annoyance to the driver. That is, the alerting apparatus 31 according to this modified example is able to display the effects of both the first example embodiment and the second example embodiment.

As the structure of the alerting apparatus 31 according to this kind of modified example, the intersect determination range setting portion 26 according to the first example embodiment may be provided instead of the intersect determination range setting portion 33 described above, for example. Also, as the alert control of the alerting apparatus 31 according to the modified example, the flow from step S203 to step S208 according to the first example embodiment may be used instead of step S303 described above. The alerting apparatus 31 according to the modified example may also deform the intersect determination range according to the steering angle of the host vehicle M, just as in the modified example of the first example embodiment.

In addition, the traffic jurisdiction determining portion 20 according to the first example embodiment may also be provided in the alerting apparatus 31 according to the second example embodiment. In this case, the alerting apparatus 31 according to the second example embodiment may perform the traffic jurisdiction determining control shown in FIG. 7.

What is claimed is:

1. An alerting apparatus that issues an alert regarding a moving obstacle to a driver of a host vehicle, when the host vehicle enters an intersection of a crossroad that is connected to a traveling road on which the host vehicle is traveling, and the traveling road, in a left-hand traffic jurisdiction, the alerting apparatus comprising:
an ECU configured to
determine a traveling direction of the host vehicle entering the intersection;

set an intersect determination range that extends out in front of the host vehicle from the host vehicle, based on a result of the determination;
obtain position information of the moving obstacle;
estimate a path of the moving obstacle, based on the position information of the moving obstacle;
determine whether the path of the moving obstacle intersects with the intersect determination range;
issue the alert regarding the moving obstacle to the driver when it is determined that the path of the moving obstacle intersects with the intersect determination range; and
set the intersect determination range to be shorter in length in a front-rear direction of the host vehicle when the traveling direction of the host vehicle is a left turn than when the traveling direction of the host vehicle is a right turn.

2. The alerting apparatus according to claim 1, wherein the ECU is configured to set the intersect determination range to have a length in the front-rear direction that is equal to or less than one-half of a road width of the crossroad when the traveling direction of the host vehicle is a left turn.

3. An alerting apparatus that issues an alert regarding a moving obstacle to a driver of a host vehicle, when the host vehicle enters an intersection of a crossroad that is connected to a traveling road on which the host vehicle is traveling, and the traveling road, in a right-hand traffic jurisdiction, the alerting apparatus comprising:
an ECU configured to
determine a traveling direction of the host vehicle entering the intersection;
set an intersect determination range that extends out in front of the host vehicle from the host vehicle, based on a result of the determination;
obtain position information of the moving obstacle;
estimate a path of the moving obstacle, based on the position information of the moving obstacle;
determine whether the path of the moving obstacle intersects with the intersect determination range;
issue the alert regarding the moving obstacle to the driver when it is determined that the path of the moving obstacle intersects with the intersect determination range; and
set the intersect determination range shorter in length in a front-rear direction of the host vehicle when the traveling direction of the host vehicle is a right turn than when the traveling direction of the host vehicle is a left turn.

4. The alerting apparatus according to claim 3, wherein the ECU is configured to set the intersect determination range to have a length in the front-rear direction that is equal to or less than one-half of a road width of the crossroad when the traveling direction of the host vehicle is a right turn.

5. The alerting apparatus according to claim 1, wherein the ECU is configured to
set a timing of the alert regarding the moving obstacle to an earlier timing when the moving obstacle is positioned on a left side of the host vehicle than when the moving obstacle is positioned on a right side of the host vehicle, when the traveling direction of the host vehicle is a left turn; and
set the timing of the alert regarding the moving obstacle to an earlier timing when the moving obstacle is positioned on the right side of the host vehicle than when the moving obstacle is positioned on the left side of the host vehicle, when the traveling direction of the host vehicle is a right turn.

6. An alerting apparatus that issues an alert regarding a moving obstacle to a driver of a host vehicle, when the host vehicle enters an intersection of a crossroad that is connected to a traveling road on which the host vehicle is traveling, and the traveling road, the alerting apparatus comprising:
an ECU configured to
determine a traveling direction of the host vehicle entering the intersection;
obtain position information of the moving obstacle;
estimate a path of the moving obstacle, based on the position information of the moving obstacle;
determine whether the path of the moving obstacle intersects with a preset intersect determination range that extends out in front of the host vehicle from the host vehicle;
issue the alert regarding the moving obstacle to the driver when it is determined that the path of the moving obstacle intersects with the intersect determination range;
set a timing of the alert regarding the moving obstacle to an earlier timing when the moving obstacle is positioned on a left side of the host vehicle than when the moving obstacle is positioned on a right side of the host vehicle, when the traveling direction of the host vehicle is a left turn; and
set the timing of the alert regarding the moving obstacle to an earlier timing when the moving obstacle is positioned on the right side of the host vehicle than when the moving obstacle is positioned on the left side of the host vehicle, when the traveling direction of the host vehicle is a right turn.

* * * * *